United States Patent
Isemura et al.

(10) Patent No.: US 7,731,093 B2
(45) Date of Patent: Jun. 8, 2010

(54) IMAGE READING/FORMING APPARATUS AND METHOD

(75) Inventors: Keizo Isemura, Tokyo (JP); Toshio Hayashi, Ibaraki (JP); Mitsushige Murata, Chiba (JP); Masatoshi Tanabe, Ibaraki (JP); Junichi Intoh, Tokyo (JP); Yoshihiro Funamizu, Chiba (JP); Yoshihito Osari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1537 days.

(21) Appl. No.: 10/900,343

(22) Filed: Jul. 28, 2004

(65) Prior Publication Data

US 2005/0029353 A1 Feb. 10, 2005

(30) Foreign Application Priority Data

Aug. 4, 2003 (JP) ............................ 2003-286159
Sep. 25, 2003 (JP) ............................ 2003-333446

(51) Int. Cl.
*G06K 19/06* (2006.01)

(52) U.S. Cl. ...................... 235/492; 235/375; 340/10.1; 340/10.51

(58) Field of Classification Search ................. 235/375, 235/492

See application file for complete search history.

(56) References Cited

U.S. PATENT DOCUMENTS

| 5,905,581 | A | 5/1999 | Suzuki et al. ............... 358/468 |
| 6,738,491 | B1 * | 5/2004 | Ikenoue et al. .............. 382/100 |
| 7,140,534 | B2 * | 11/2006 | Miyazawa et al. .......... 235/375 |
| 7,630,093 | B2 * | 12/2009 | Watanabe et al. ........... 358/1.15 |
| 2002/0170973 | A1 * | 11/2002 | Teraura ....................... 235/492 |
| 2003/0214388 | A1 * | 11/2003 | Stuart et al. ................. 340/10.1 |

FOREIGN PATENT DOCUMENTS

| JP | 11-231738 | 8/1999 |
| JP | 2000-187420 | 7/2000 |
| JP | 2000-227742 | 8/2000 |
| JP | 2000-285203 | 10/2000 |
| JP | 2001-160117 | 6/2001 |
| JP | 2001-180021 | 7/2001 |
| JP | 2001-218030 | 8/2001 |
| JP | 2002-190911 | 7/2002 |
| JP | 2002-211177 | 7/2002 |
| JP | 2002-337426 | 11/2002 |
| JP | 2003-123042 | 4/2003 |

OTHER PUBLICATIONS

Japanese Office Action dated Jun. 23, 2008, issued in corresponding Japanese patent application No. 2003-286159.
Japanese Office Action dated May 23, 2008, issued in corresponding Japanese patent application No. 2003-333446.

* cited by examiner

*Primary Examiner*—Daniel A Hess
*Assistant Examiner*—Michael Andler
(74) *Attorney, Agent, or Firm*—Fitzpatrick, Cella, Harper & Scinto

(57) ABSTRACT

An RFID tag formed on an original includes a storage unit which stores data representing, e.g., the number of times of scan of the original and the generation from a parent original, and a transmitter/receiver which transmits and receives the data by radio. A read/write circuit receives data from an RFID tag of an original by radio. On the basis of the received data, read of the original is controlled. While the original is being read, the received data is edited in accordance with the control. The read/write circuit transmits and writes the edited data in the RFID tag.

10 Claims, 31 Drawing Sheets

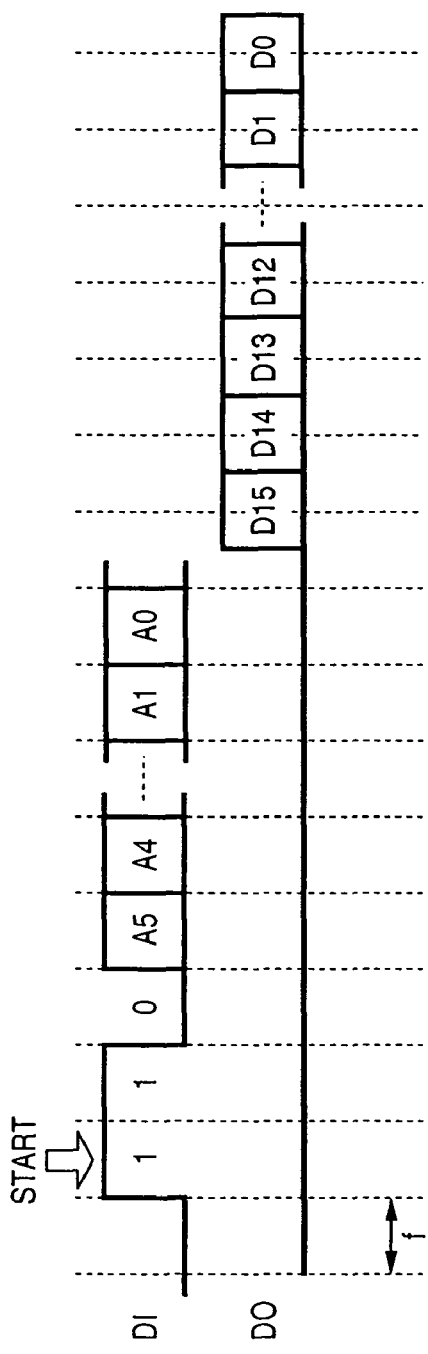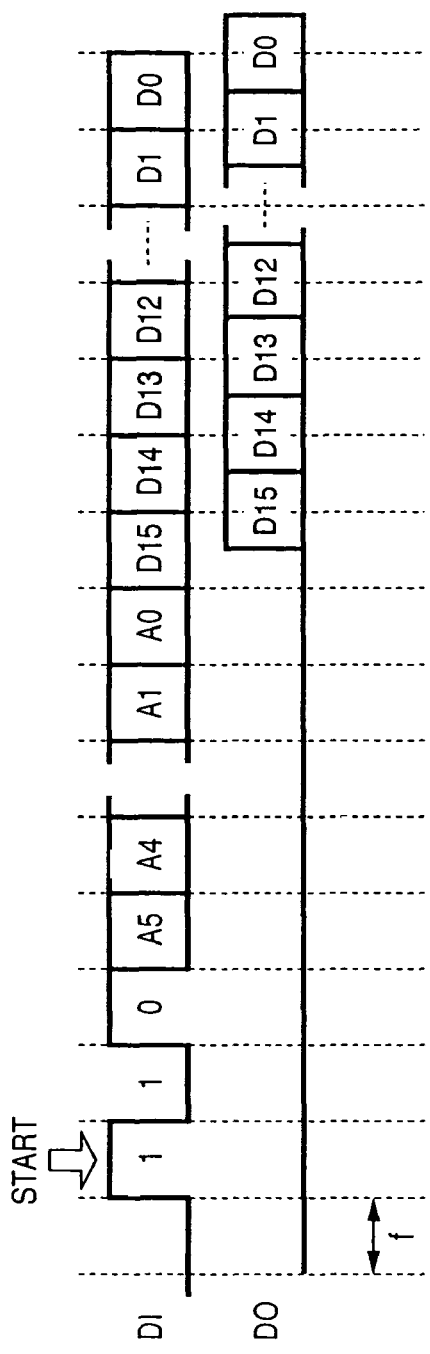

FIG. 3

| COMMAND || CONTROL CONTENTS |
|---|---|---|
| 1 | 0 | READ |
| 0 | 1 | WRITE |

FIG. 4

| ADDRESS | DATA (16 BITS) |
|---|---|
| 00h | TAG ID #0 |
| 01h | TAG ID #1 |
| 02h | TOTAL COUNTER |
| 03h | TOTAL LIMIT COUNTER |
| 04h | GENERATION COUNTER |
| 05h | GENERATION LIMIT COUNTER |
| 06h | SCAN INHIBIT FLAG |
| ⋮ | |
| 3Fh | |

FIG. 22

| ADDRESS | DATA (16 BITS) |
|---|---|
| 00h | TAG ID #0 |
| 01h | TAG ID #1 |
| 02h | PAGE NUMBER |
| 03h | SHEET SIZE |

⋮

| 10h | POST-PROCESSING MODE SETTING |
|---|---|
| 11h | POST-PROCESSING LOG |
| 12h | TOTAL NUMBER OF PAGES |
| 13h | REPRESENTATIVE SIZE |
| 14h | BUNDLE STATE |

⋮

| 3Fh | |
|---|---|

FIG. 29

| ADDRESS | DATA (16 BITS) |
|---|---|
| 00h | TAG ID #0 |
| 01h | TAG ID #1 |
| 02h | PERSONAL INFORMATION DATA #00 |
| 03h | PERSONAL INFORMATION DATA #01 |

⋮

| 10h | PERSONAL INFORMATION DATA #0d |
|---|---|
| 11h | PERSONAL INFORMATION DATA #0e |
| 12h | PERSONAL INFORMATION DATA #0f |
| 13h | PERSONAL INFORMATION DATA #10 |
| 14h | PERSONAL INFORMATION DATA #11 |

⋮

| 1FFh | |
|---|---|

IMAGE READING/FORMING APPARATUS AND METHOD

FIELD OF THE INVENTION

The present invention relates to an image reading/forming technique and, more particularly, to an image reading/forming technique which uses an RFID (Radio Frequency IDentification) tag attached to an original.

BACKGROUND OF THE INVENTION

Recently, a small-sized IC chip containing a radio device called an RFID (Radio Frequency Identification) tag and a memory is attracting attention. The RFID tag is also called an IC tag or mu-chip, and a very small square chip of 0.04 mm side has been announced as a non-rewritable ROM type chip.

Conventionally, a copying apparatus which copies an original having this RFID tag is known (Japanese Patent Laid-Open No. 2002-337426). This reference proposes a technique by which user ID information is input from an operation unit of the copying machine, and written in the RFID tag on an original. In this way, data of a person who copied this original can be stored in the RFID tag and managed.

It is sometimes desirable to limit image read depending on the type of original. For example, a method of limiting scan of an original by forming a watermark on the original is known. In this method, however, the watermark is reflected on all read images. This is inconvenient. Therefore, there are needs of more convenient and flexible techniques allowing image read at least a predetermined number of times.

Also, in some cases a certain parent original is copied to form a child original and this child original is copied to form a grandchild original. When copying is thus repeated over a number of generations, the image deteriorates. Accordingly, it is desirable to avoid, by some means, to repeat image read or copying over a number of generations to such an extent that the image quality of the original is no longer maintainable.

SUMMARY OF THE INVENTION

Accordingly, the present invention provides a technique which controls read of an original by using an RFID tag attached to the original.

According to one aspect of the present invention, it provides a technique by which information for controlling read of an original is stored in an RFID tag attached to the original.

According to another aspect of the present invention, it provides a technique which reads image data concerning an original from an RFID tag attached to the original. It is also possible to optically read an image of an original having no RFID tag.

According to another aspect of the present invention, it provides a technique which, when an image is to be formed on a plurality of printing media, attaches RFID tags only to some printing media.

According to another aspect of the present invention, it provides a technique which writes biological information in an RFID tag attached to an original.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B show examples of read/write control of a memory 101 according to the first embodiment;

FIG. 3 shows examples of commands according to the first embodiment;

FIG. 4 shows the address map of the memory 101 according to the first embodiment;

FIG. 22 shows a view for explaining the address map of a memory of an RFID tag;

FIG. 29 shows a view for explaining the address map of a memory of the RFID tag according to the ninth embodiment;

DETAILED DESCRIPTION OF THE PREFERRED EMBODIMENTS

Preferred embodiments of the present invention will now be described in detail in accordance with the accompanying drawings.

First Embodiment

Figure 1:
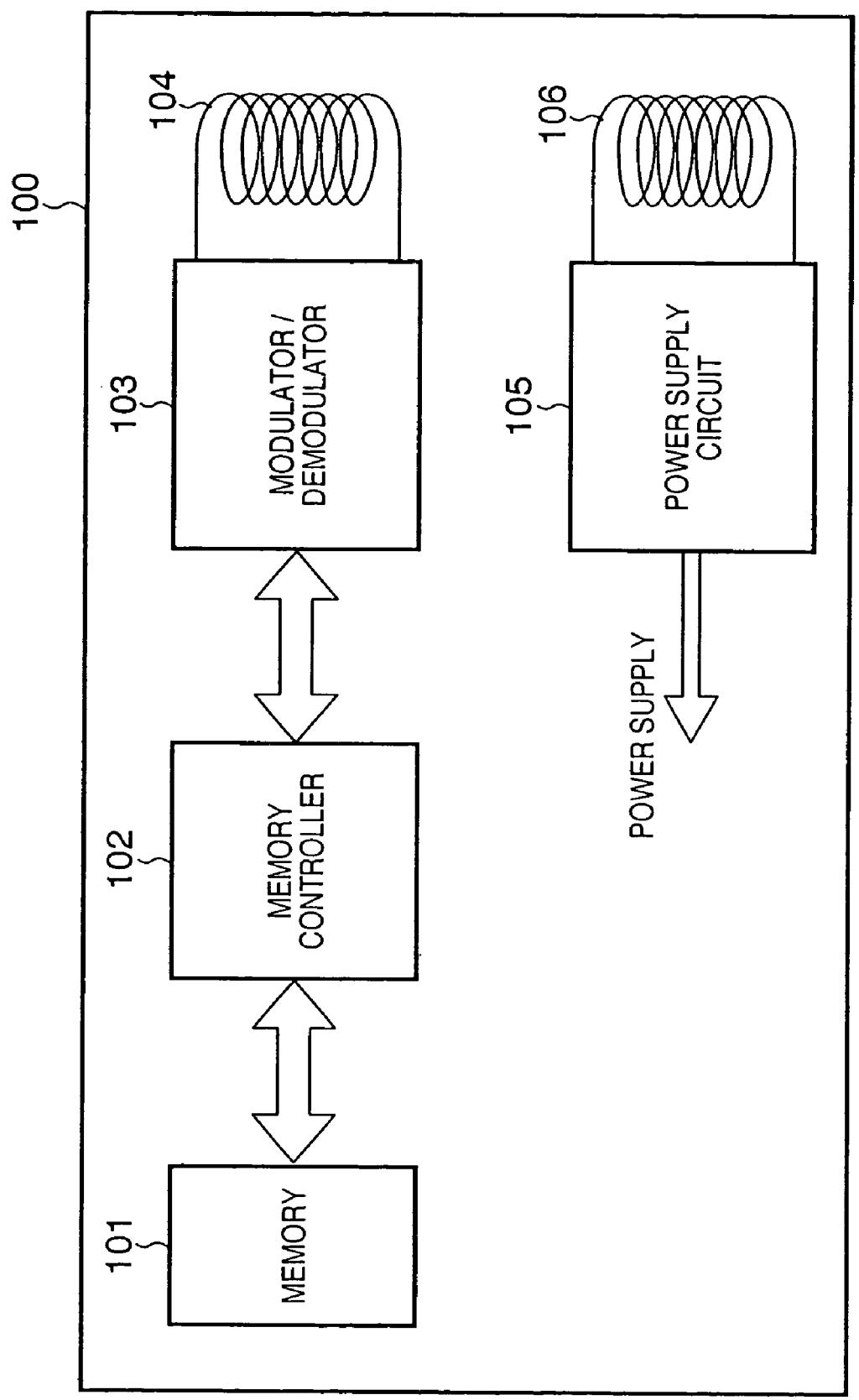
FIG. 1 shows a block diagram of an example of an RFID tag 100 embedded in an original according to the first embodiment.

First, an example of an RFID tag used in this embodiment will be explained below. FIG. 1 is a block diagram showing an example of an RFID tag 100 according to this embodiment. As will be described below, the RFID tag 100 is roughly made up of a storage unit and transmitter/receiver.

A memory 101 is a storage device such as an EEPROM which does not lose data even if the power supply is turned off. Also, the memory 101 has addresses meeting the capacity, and has a 16-bit data storage area for each address. A memory controller 102 controls data write to the memory 101, and also controls read of data stored in the memory 101. A modulator/demodulator 103 is a modulation/demodulation circuit which receives readout data from the memory 101 via the memory controller 102, modulates the received data, and outputs the modulated data to a coil 104, or demodulates data of a signal received from the coil 104, and outputs the demodulated data to the memory controller 102. The coil 104 is an antenna circuit for receiving a radio signal from a read/write device (to be referred to as a read/write circuit hereinafter), and transmitting a radio signal to this read/write circuit. Note that the memory controller 102 controls data read and write to the memory 101 in accordance with commands received from the read/write circuit. A coil 106 generates electromotive force by external electromagnetic induction. On the basis of this electromotive force from the coil 106, a power supply circuit 105 supplies electric power to each circuit of the RFID tag. The RFID tag 100 is desirably supplied as a chip IC integrated at a high density.

FIGS. 2A and 2B illustrate examples of read/write control of the memory 101 according to this embodiment. This control can be changed in accordance with the type of the memory 101. In this explanation, assume that the memory 101 is a general EEPROM.

For example, FIG. 2A shows a data format for read. First, when a power transmission wave is transmitted from the read/write circuit, the coil 106 receives this power transmission wave, and generates induced electromotive force. The thus generated electromotive force is supplied as electric power to each circuit via the power supply circuit 105. The memory controller 102 monitors serial data DI received via the coil 104 and modulator/demodulator 103, and detects the transition of a bit from 0 to 1 in particular. In DI, the first transition from 0 to 1 is defined as a start bit. 2-bit data following this start bit is command data.

In this example shown in FIG. 2A, the data transition timing is a predetermined frequency f. The read/write circuit and RFID tag operate in accordance with the frequency f. To reliably synchronize the read/write circuit and RFID tag, a sync clock generator which oscillates at the frequency f-need only be used.

Figure 3:
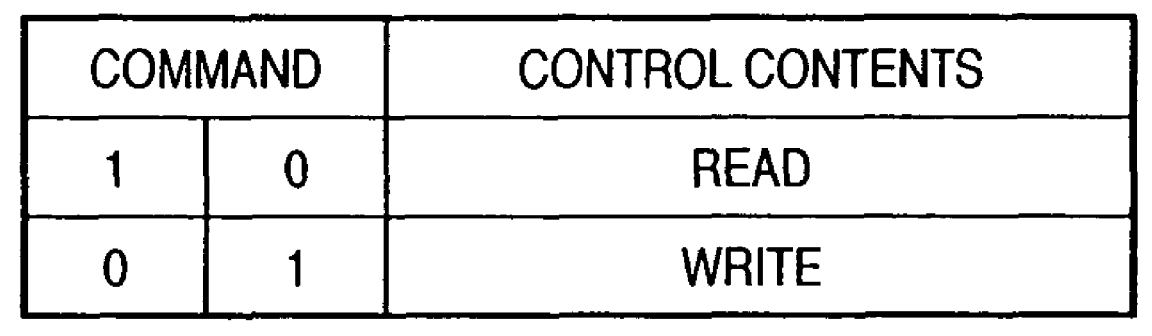

FIG. 3 shows examples of commands according to this embodiment. For example, FIG. 3 indicates that command data "1,0" in FIG. 2A means a read command. The memory controller 102 which has received this read command controls the memory 101 in a read mode. 6-bit data following the command data indicates an address. The memory controller 102 reads out data stored in this address from the memory 101 as serial data D0. The memory controller 102 outputs the serial data D0 to the modulator/demodulator 103. The modulator/demodulator 103 modulates the serial data D0, and the coil 104 transmits the modulated wave.

FIG. 2B shows a data format for write. When receiving a write command "0,1", the memory controller 102 controls the memory 101 in a write mode. the memory controller 102 acquires an address indicated by 6-bit data following the command data. In addition, the memory controller 102 writes, in the acquired address, 16-bit data immediately following the address data.

Note that at the same time data is written, it is also possible to output the written data as serial data D0 from the memory controller 102 to the modulator/demodulator 103, generate a modulated wave by the modulator/demodulator 103, and transmit the generated wave from the coil 104 to the read/write circuit. This allows the read/write circuit to determine whether the data transmitted to the RFID tag 100 is correctly written.

The memory 101 uses a 6-bit storage area to express an address and a 16-bit storage area to express data, and has a total storage capacity of 1 k bits.

FIG. 4 shows the address map of the memory 101 according to this embodiment. Addresses 00h and 01h are areas for storing a unique ID for identifying the RFID tag. Address 02h stores a total counter for counting the number of times of read of an original in which the RFID tag is embedded. Address 03h stores the upper-limiting number of times for limiting the number of times of read of an original. Address 04h stores a generation counter for counting the generation of an original in which the RFID tag is embedded. Address 05h stores a generation limit counter for limiting read or copying of an original over a number of generations. Address 06h stores a scan inhibit flag which inhibits read of an original if specific read inhibiting conditions hold. By performing data read/write in accordance with the predetermined address map, invisible information except for image information can be held in the RFID tag of an original. Note that about 4.2 billions of different pieces of original information can be stored in the RFID tag 100 by using the information in addresses 00h to 01h. If the capacity of the memory 101 is large, image data of an original may also be stored in addresses on and after address 07h.

Figure 5:
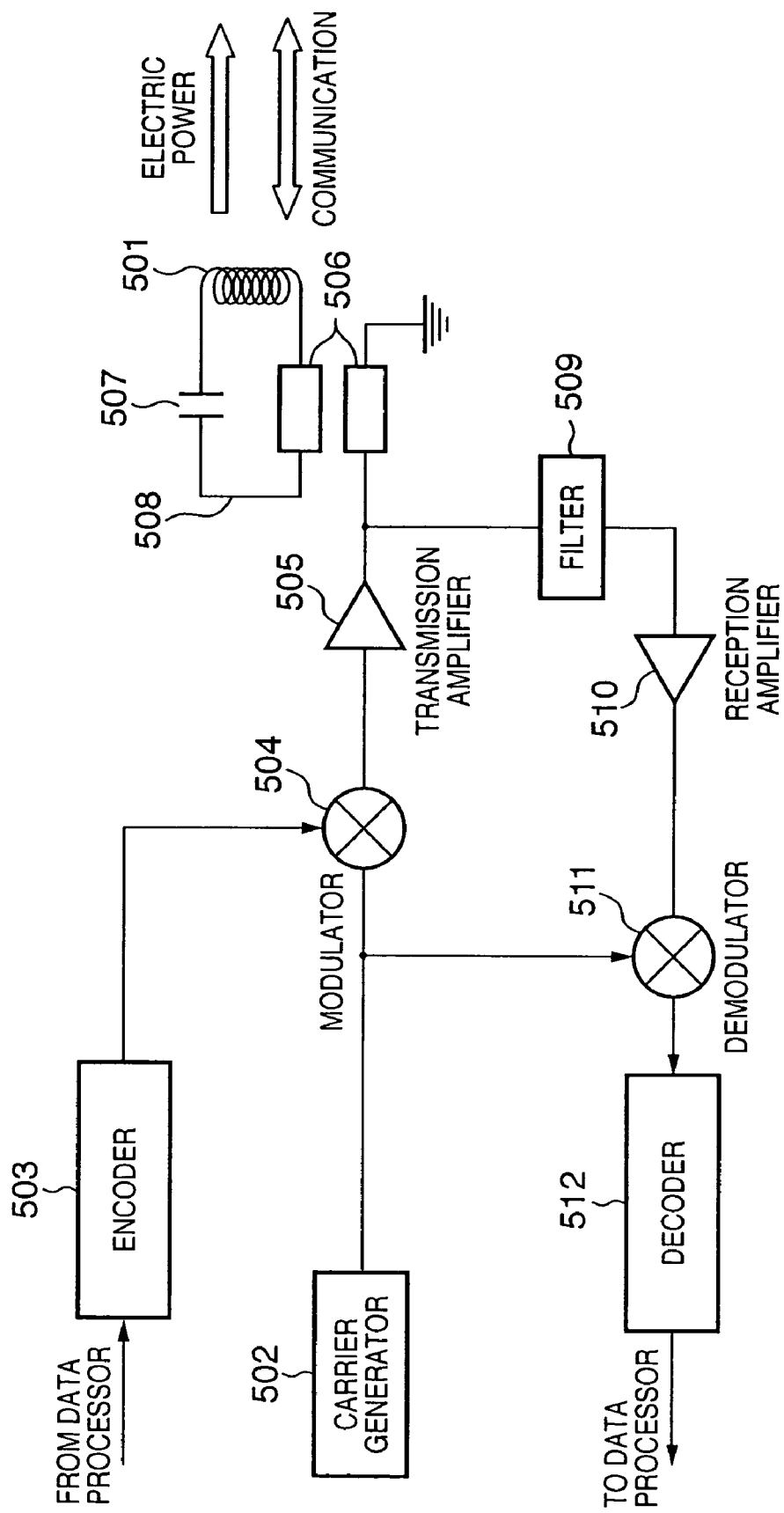
FIG. 5 shows a block diagram of an example of a read/write circuit according to the first embodiment.

The read/write circuit which functions as a transmitter/receiver as a counterpart of the RFID tag will be explained below. FIG. 5 is a block diagram showing an example of the read/write circuit according to this embodiment. An R/W coil (reader or/and writer coil) 501 of the read/write circuit transmits a power transmission wave and data communication modulated wave to the coil 104 of the RFID 100, and receives a radio signal transmitted from the coil 104. Note that the power transmission wave and signal wave may also be transmitted from different antennas.

Figure 6:
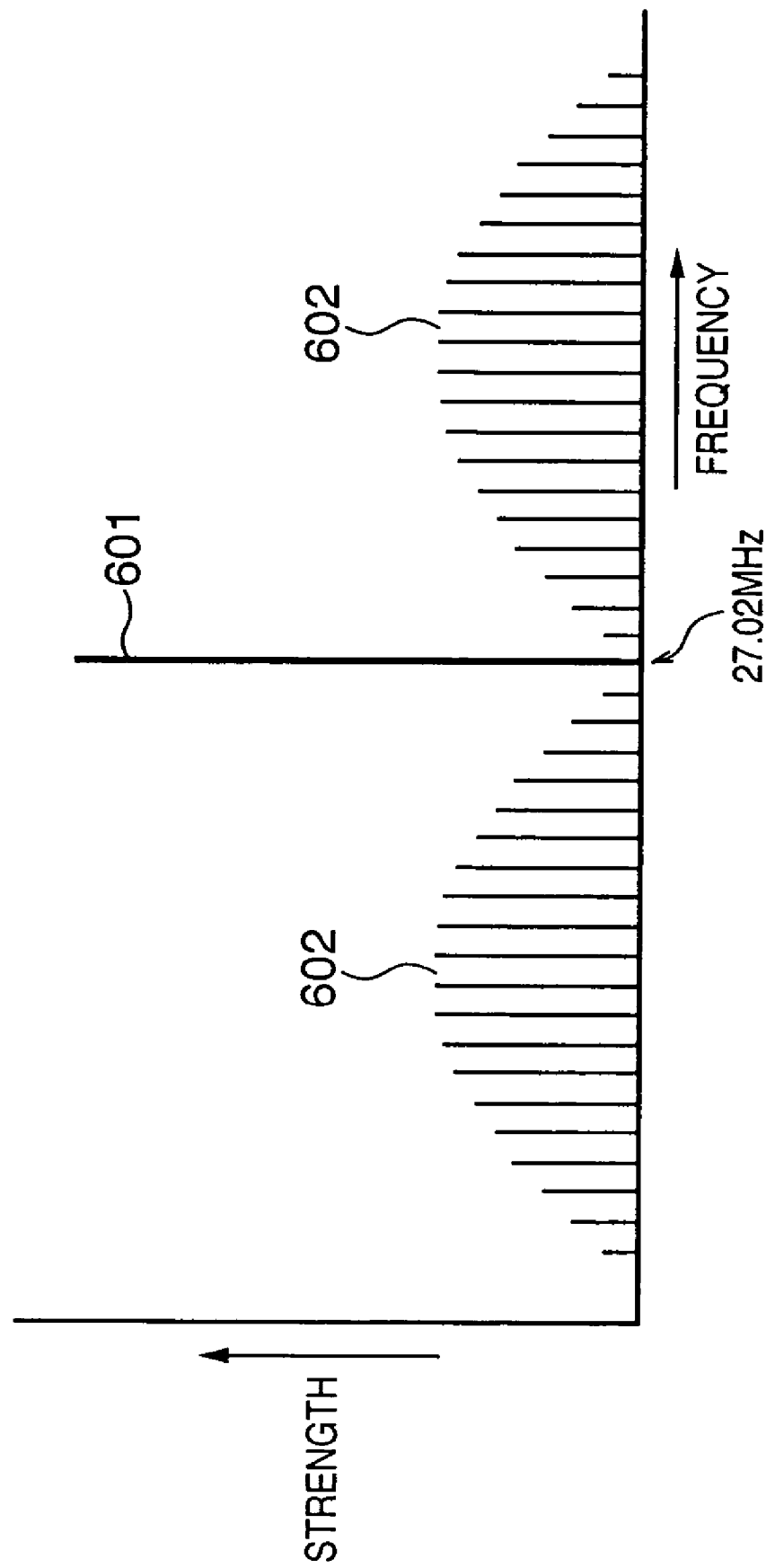
FIG. 6 shows an example of a radio signal according to the first embodiment.

FIG. 6 shows an example of a radio signal according to this embodiment. In this example, a power transmission wave 601 is an electromagnetic wave which has a center frequency of 27.02 MHz and supplies power for driving the RFID tag 100. Also, a data communication modulated wave 602 has a center frequency of 27.02 MHz, and is transmitted and received by the coil 104. Read/write access to the memory 101 of the RFID tag 100 is executed by the data communication modulated wave 602.

A carrier signal generator 502 is an oscillation circuit which generates a 27.02-MHz carrier signal. An encoder 503 encodes data to be transmitted to the RFID tag 100. A modulator 504 superposes the 27.02-MHz carrier signal and the data signal encoded by the encoder 503 by ASK modulation (amplitude modulation: Amplitude Shift Keying modulation). A transmission amplifier 505 is an amplification circuit which amplifies the output modulated signal from the modulator 504. An inductance coupler 506 couples the modulated signal amplified by the transmission amplifier 505 to a matching circuit 508. The matching circuit (feeder circuit) 508 includes a capacitor 507 and prevents reflection by matching the impedances. The coil 501 functions as a writer coil which generates an electromagnetic wave to transmit electric power and data in accordance with the output from the matching circuit 508.

Note that the coil (reader or/and writer coil) 501 also functions as a read coil which receives data transmitted on an electromagnetic wave from the coil 104 of the RFID tag 100. This signal received by the coil 501 is matched by the matching circuit 508, and coupled by the inductance coupler 506, thereby generating a reception signal. A filter circuit 509 is a bandpass circuit which removes noise components from this reception signal. A reception amplifier 510 is an amplification circuit which amplifies the output reception signal from the filter circuit 509. A demodulator 511 demodulates the amplified signal by using a 27.02-MHz driving signal. A decoder 512 decodes the signal demodulated by the demodulator 511 to generate reception data, and outputs this reception data.

The read/write circuit having the above arrangement performs ASK modulation on data input from a data processor (not shown), and transmits the modulated data from the coil 501. The read/write circuit also decodes ASK-modulated data received from the coil 501, and outputs the decoded data to the data processor.

Although the circuit shown in FIG. 5 has both a read circuit and a write circuit, it may have only one of read and write circuits depending upon the application. For example, an image formation apparatus or an image reading apparatus with only a write circuit, or an image formation apparatus or an image reading apparatus with only a read circuit can be provided by using the invention of this embodiment.

Figure 7:
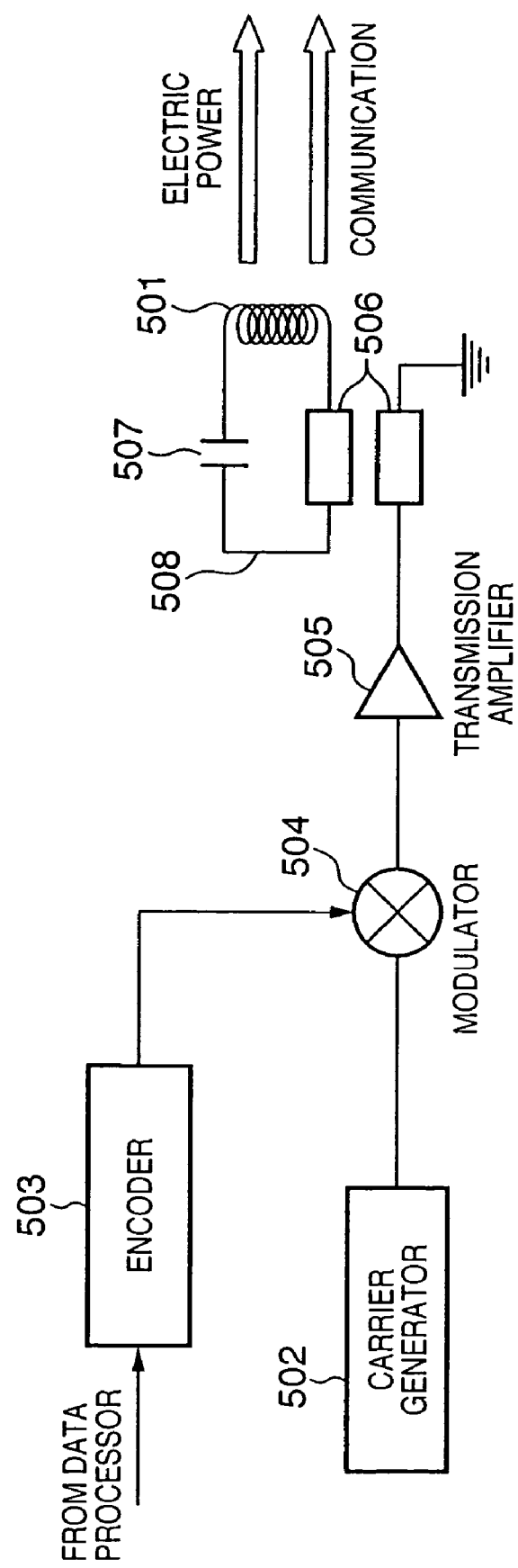
FIG. 7 shows the arrangement of a write circuit according to the first embodiment.
Figure 8:
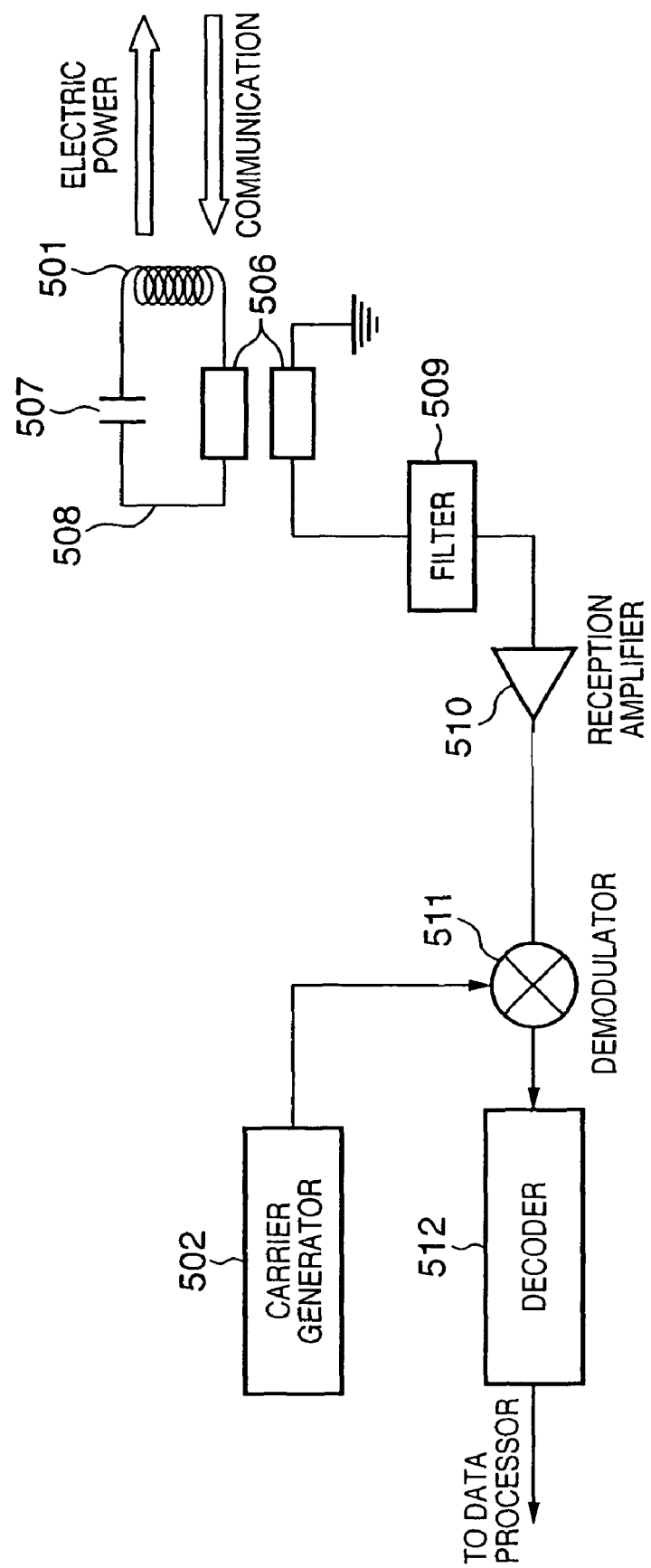
FIG. 8 shows the arrangement of a read circuit according to the first embodiment.

FIG. 7 shows the arrangement of a write circuit according to this embodiment. FIG. 8 shows the arrangement of a read circuit according to this embodiment. The arrangements of these circuits are substantially the same as the circuit for performing the read process and the circuit for performing the write process explained with reference to FIG. 5. Therefore, the same reference numerals as in FIG. 5 denote the same parts, and a detailed explanation thereof will be omitted.

Figure 9:
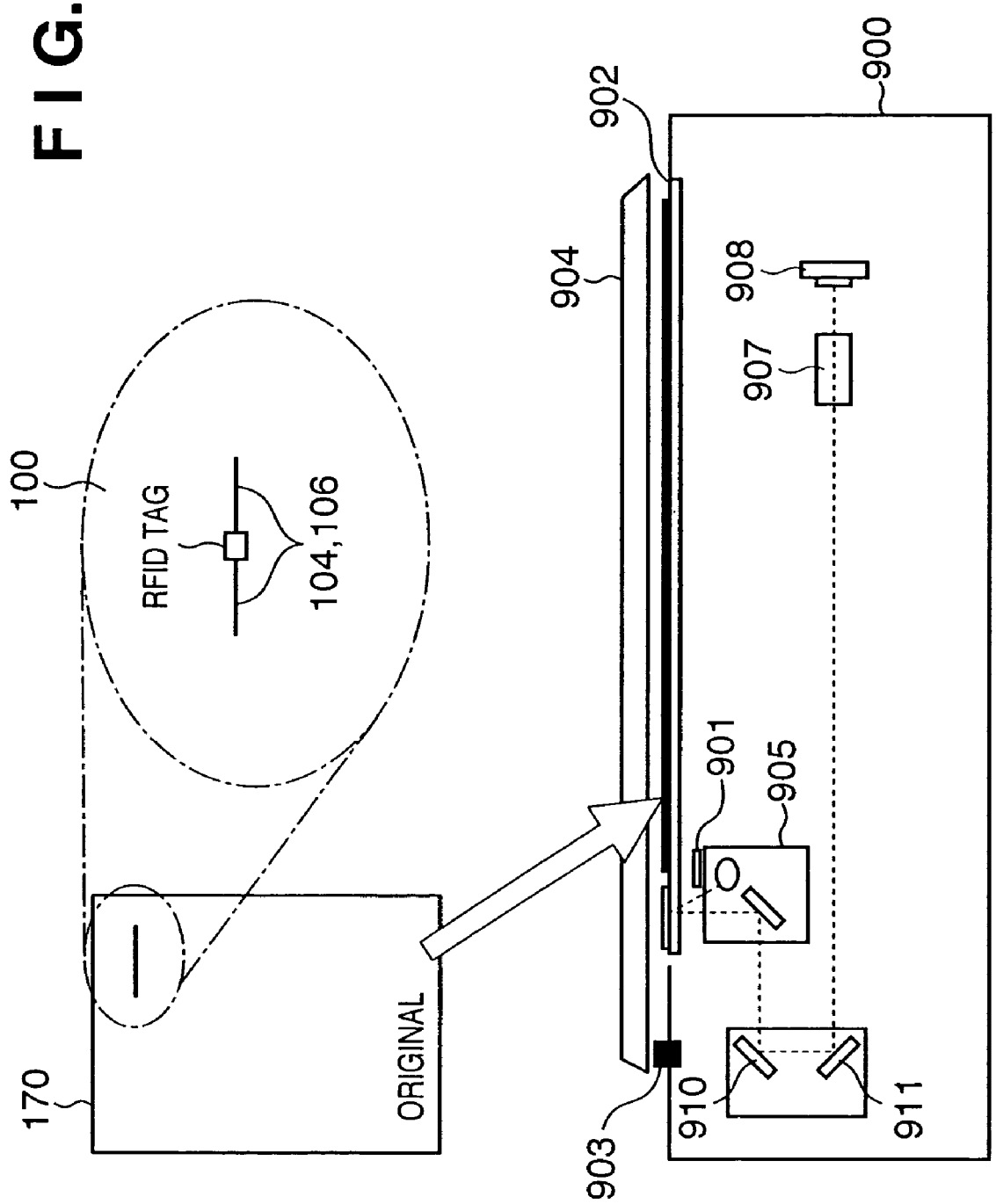
FIG. 9 shows the arrangement of an image reading apparatus according to the first embodiment.
Figure 10:
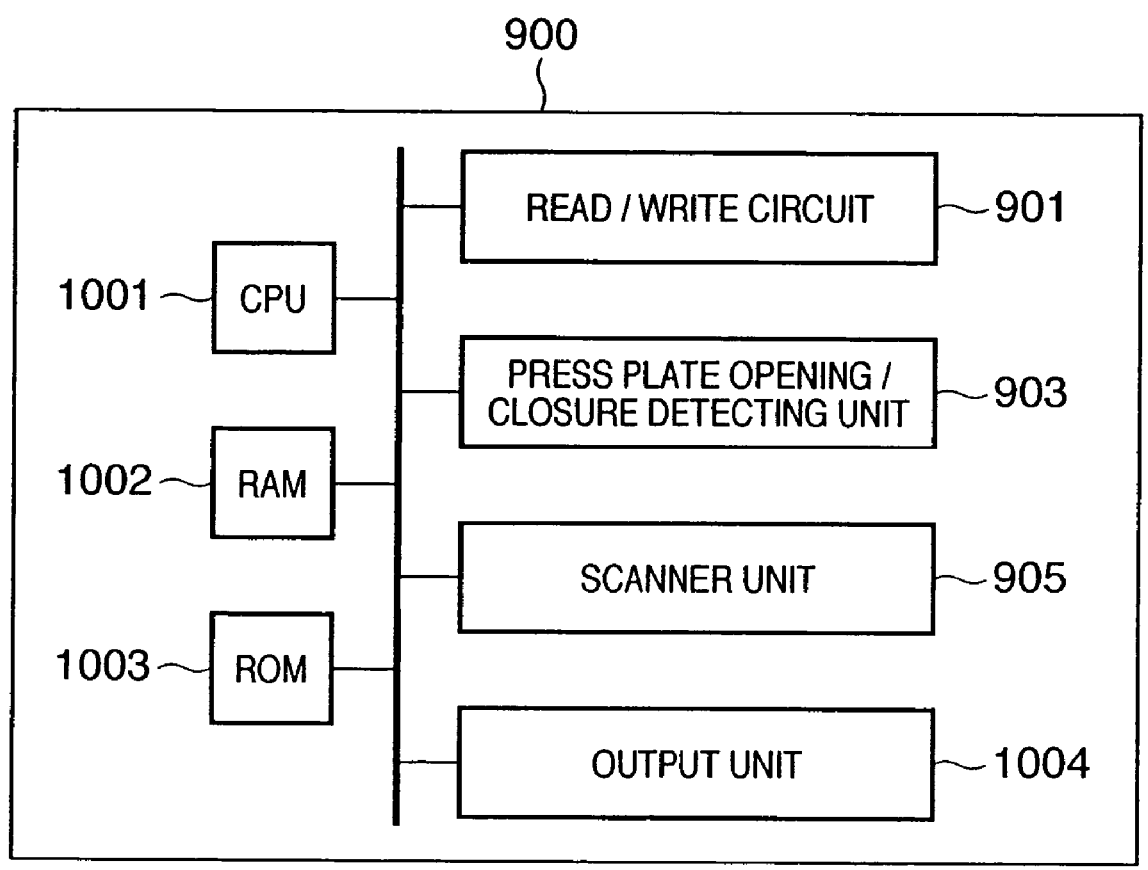
FIG. 10 shows a block diagram of the electrical arrangement of the image reading apparatus according to the first embodiment.

FIG. 9 shows the arrangement of an image reading apparatus according to this embodiment. An image reading apparatus 900 is, e.g., a scanner apparatus for a personal computer, or a scanner unit of a copying machine, multifunction apparatus, or facsimile apparatus. FIG. 10 is a block diagram showing the electrical configuration of the image reading apparatus according to this embodiment. A CPU 1001 comprehensively controls the image reading apparatus 900 on the basis of an image read control program stored in a ROM 1003. The CPU 1001 uses a RAM 1002 as a work area.

In the image reading apparatus 900, a read/write circuit 901 described above is incorporated into a scan unit 905 for reading an original. The read/write circuit 901 reads out control information necessary for image read control from the RFID tag 100 attached to an original, and writes information reflecting the control results.

For example, when an original 170 is placed on an original glass plate 902 and a press plate 904 is closed, a press plate opening/closure detecting unit 903 detects that the press plate 904 is closed. By using this detection as a trigger, the CPU 1001 controls the read/write circuit 901 to start reading (receiving) data from the RFID tag 100. It is also possible to always or periodically drive the read/write circuit 901 to monitor transmission of data from the RFID tag 100, without detecting opening/closure of the press plate, thereby receiving data from the RFID tag 100 of an original placed on the original glass plate. Instead of the press plate opening/closure detecting unit 903, an original detecting unit which detects the placement of an original may also be used.

The present invention is also applicable to an image reading apparatus having a sheet feeding device, such as an automatic document feeder, instead of the original glass plate. For example, the same functions as in this embodiment can be realized by installing the read/write circuit 901 in a position where an original is placed.

Figure 11:
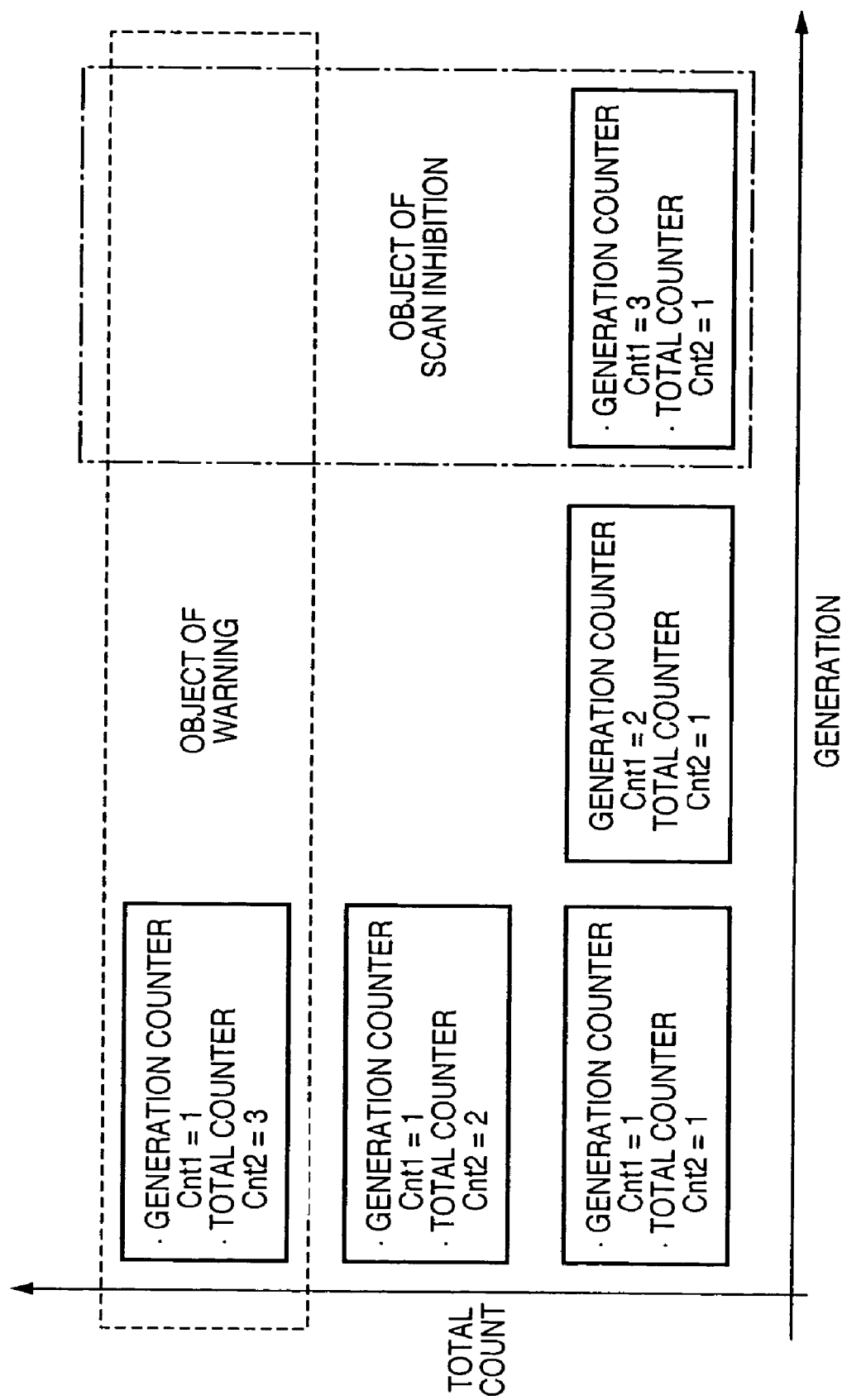
FIG. 11 shows the concept of scan limitation according to the first embodiment.

FIG. 11 shows the concept of scan (image reading process) limitation according to this embodiment. The ordinate indicates the number of times of scan of an original, and the abscissa indicates the number of generations of an original. The dotted lines represent an object of warning, and the alternate long and short dashed lines represent an object of scan inhibition.

In this example, control is so performed as to inhibit scan of an original of three generations or more. Also, warning is output when the total number of times of scan is 3 or more. Note that control may also be performed such that scan is not inhibited for an original of two generations or less, even if the total number of times of scan is 3 or more. Image read control can be performed by using either one or both of the limitation by generations and the limitation by the number of times of scan.

Figure 12:
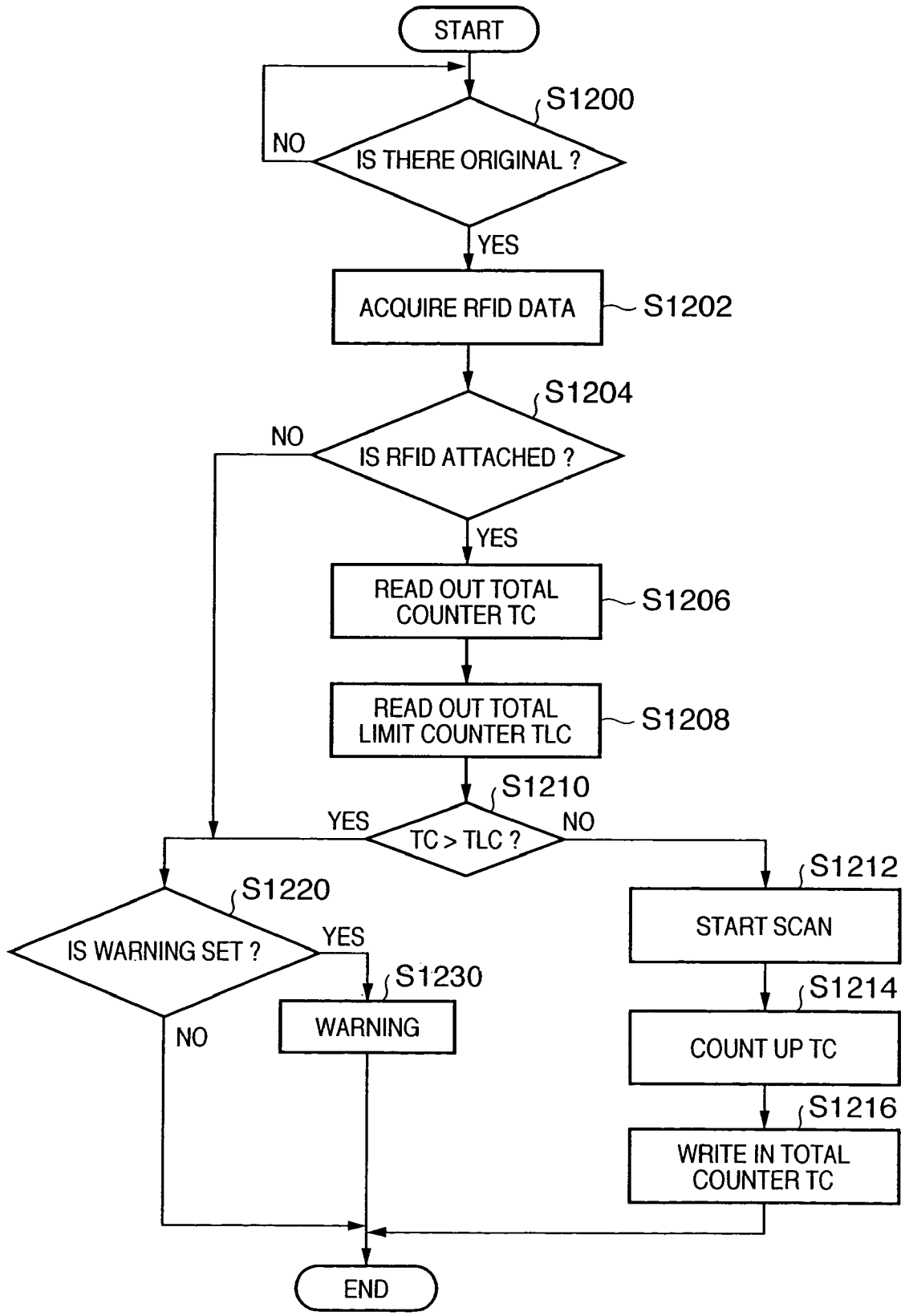
FIG. 12 shows a flowchart of image read control according to the first embodiment.

FIG. 12 is a flowchart of image read control according to this embodiment. A control program corresponding to this flowchart is stored in the ROM 1003, and the CPU 1001 executes the following processing in accordance with this program.

In step S1200, the CPU 1001 determines whether the original 170 is set in a predetermined position on the basis of detection data output from the original detecting unit or press plate opening/closure detecting unit 903. If there is an original, the flow advances to step S1202.

In step S1202, to detect whether the original 170 has the RFID tag 100, the CPU 1001 transmits a power transmission wave and a predetermined command (e.g., an ID tag request command or read inhibit flag request command) from the read/write circuit 901. It is also possible to transmit a read command to read out various control data stored in the memory 101 of the RFID tag 100.

In step S1204, the CPU 1001 determines whether the read/write circuit 901 has received a predetermined response radio signal from the RFID tag 100. If the RFID tag is attached, the flow advances to step S1206. If no RFID tag is attached, the flow advances to S1220, and the CPU 1001 inhibits read of the original.

For an original from which no predetermined response radio signal can be received, the CPU 1001 outputs, to an output device 1004, a setting window for setting whether to validate a read inhibiting process such as a warning process. Subsequently, on the basis of information input from an operation panel (not shown), the CPU 1001 stores information representing valid or invalid of the read inhibiting process in the EEPROM. If no predetermined response radio signal can be received, it is also possible to read out information representing valid or invalid of the read inhibiting process from the EEPROM, and determine whether to execute the read inhibiting process on the basis of the readout contents.

If the response signal contains an inhibit flag, it is also possible to immediately advance the flow to step S1230 to inhibit the image reading process.

In step S1206, the CPU 1001 supplies a read command and data of an address storing a total counter (TC) to the read/write circuit 901, and causes the read/write circuit 901 to transmit the command and data to the RFID tag 101. The total counter (TC) is a variable representing the number of times of scan of an original. The read/write circuit 901 receives the total counter (TC) transmitted from the RFID tag 101, and outputs the total counter (TC) to the CPU 1001. The CPU 1001 stores the received total counter (TC) in the RAM 1002.

In step S1208, the CPU 1001 reads out a total limit counter (TLC) representing the upper-limiting number of times for limiting original read. More specifically, the CPU 1001 supplies a read command and data of an address storing the total limit counter (TLC) to the read/write circuit 901, and causes the read/write circuit 901 to transmit the command and data. The read/write circuit 901 receives the total limit counter (TLC) transmitted from the RFID tag 101, and outputs the total limit counter (TLC) to the CPU 1001. The CPU 1001 stores the received total limit counter (TLC) in the RAM 1002.

In step S1210, the CPU 1001 determines whether original read is to be limited. For example, the CPU 1001 reads out the value of the total counter and the value of the total limit counter from the RAM 1002, and determines whether the value of the total counter exceeds the value of the total limit counter. If the former exceeds the latter, the flow advances to step S1220; if not, the flow advances to step S1212.

In step S1212, the CPU 1001 executes the process of reading the original image. That is, the CPU 1001 transmits a read start instruction to the scanner driving unit 905 to start image read.

In step S1214, the CPU 1001 reads out the total counter value stored in the RAM 1002, counts up the value, and writes the value in the RAM 1002.

In step S1216, the CPU 1001 reads out the total counter value stored in the RAM 1002, and outputs the readout value and a write command to the read/write circuit 901. The read/write circuit 901 transmits the write command, write address, and the total counter value to the RFID tag 100. The memory controller 102 of the RFID tag detects the write command, and writes the received total counter value in the memory 101 on the basis of the received write address.

In step S1220, the CPU 1001 reads out a warning flag prestored in the RAM 1002 or EEPROM, and determines whether to execute a warning process. This warning flag is information representing whether to execute the warning process if predetermined conditions are met. The warning flag is preset by the user and written in the EEPROM or the like. If the warning flag is so set as to execute warning, the flow advances to step S1230. If the warning flag is so set as not to execute warning, the process is terminated.

In step S1230, the CPU 1001 outputs warning information such as a sound, characters, or an image from the output unit 1004. This warning information is probably output if no RFID tag 101 is present on an original, or if the number of times of scan exceeds a predetermined number of times as a limit. The warning information is, e.g., a message which informs a user that image read is inhibited.

In the above flowchart, warning and scan inhibition are executed. However, scan may also be executed after warning is output. For example, the image reading apparatus may also be so set that an image of an original having no RFID tag 101 is normally scanned after warning is output.

In this embodiment as described above, there is provided the image reading apparatus 900 which reads an image from the original 170 having the RFID tag 100 which includes a storage unit (e.g., the memory 101) for storing data, and a transmitter/receiver (e.g., the modulator/demodulator 103) for transmitting and receiving the data by radio. The image reading apparatus 900 comprises receiving means (e.g., the read/write circuit 901) for receiving data stored in the RFID tag of the original, read control means (e.g., the CPU 1001) for controlling read of the original on the basis of the received data (e.g., the total counter TC and total limit counter TLC), image reading means (e.g., the scanner unit 905) for reading the original under the control of the image read control means, data editing means (e.g., the CPU 1001) for editing the received data in accordance with the contents of the control performed by the read control means, and writing means (e.g., the read/write circuit 901) for transmitting the data edited by the data editing means to the RFID tag, and writing the data in the RFID tag.

With this arrangement, it is possible to prevent an original from being read more times than a predetermined number of times. Image read can be inhibited if no information can be read out from the RFID tag, such as when no RFID tag 100 is attached to an original. This makes it possible to effectively inhibit read of an original whose RFID tag 100 is intentionally destroyed or removed. If data read from the RFID tag is inhibited, the CPU 1001 may also temporarily cancel inhibition and execute image read, provided that a predetermined cancellation request is input from the operation unit.

Second Embodiment

In the first embodiment, image read is limited by the total counter which represents the number of times of scan. In this embodiment, original read over a plurality of generations is limited, such as when a parent original is copied to form a child original and this child original is further copied to form a grandchild original.

Figure 13:
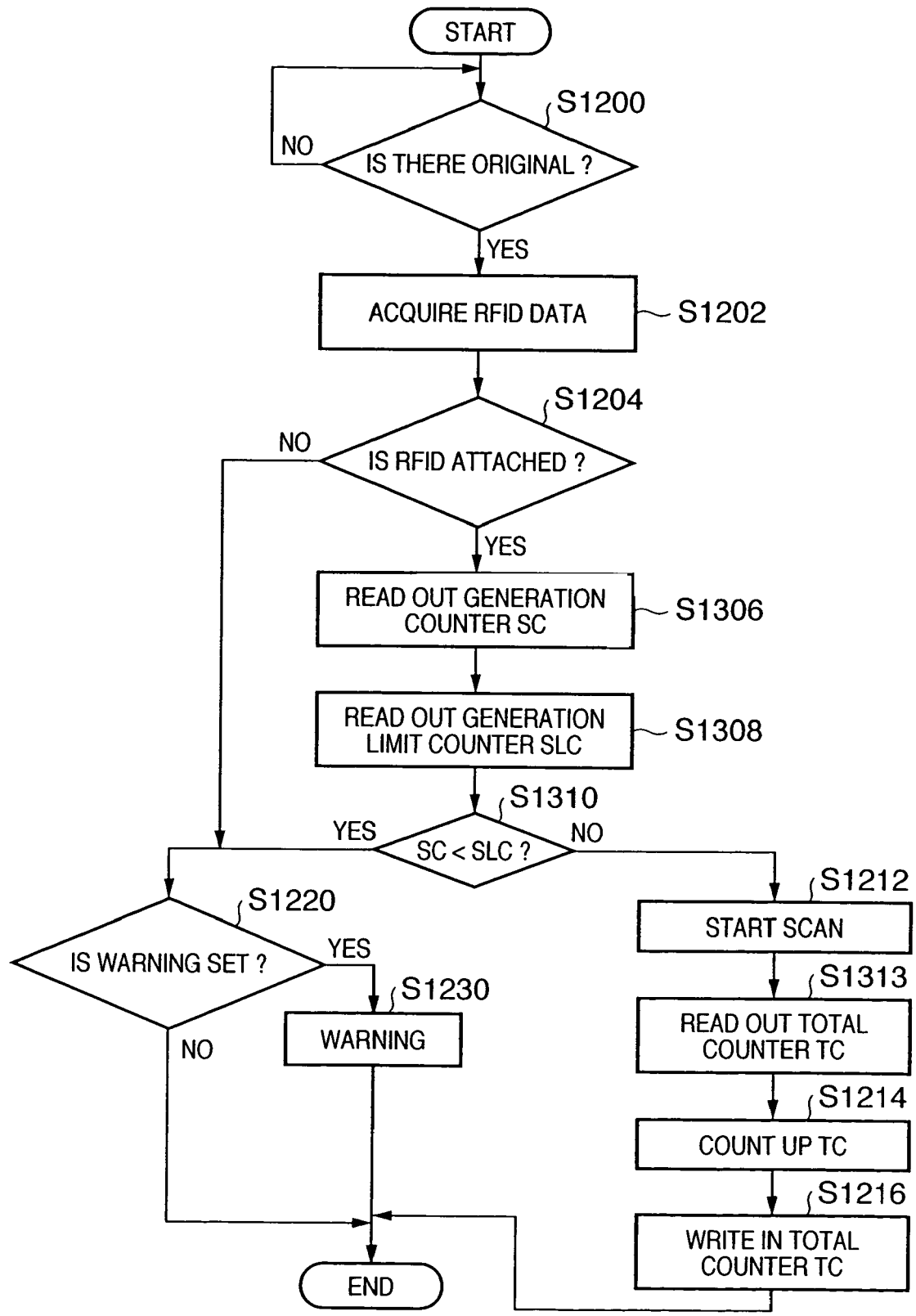
FIG. 13 shows a flowchart of image read control according to the second embodiment.

FIG. 13 is a flowchart of image read control according to the second embodiment. The same reference numerals as in the first embodiment denote the same processes, and an explanation thereof will be omitted. First, steps S1200 to S1204 are executed, and the flow advances to step S1306.

In step S1306, a CPU 1001 supplies a read command and data of an address storing a generation counter (SC) to a read/write circuit 901, and causes the read/write circuit 901 to transmit the command and data to an RFID tag 100. The generation counter (SC) is a variable which represents the generation of an original. The read/write circuit 901 receives the generation counter (SC) transmitted from the RFID tag 100, and outputs the received generation counter (SC) to the CPU 1001. The CPU 1001 stores the received generation counter (SC) in a RAM 1002.

In step S1308, the CPU 1001 reads out a generation limit counter (SLC) which represents the upper-limiting generation for limiting original read. More specifically, the CPU 1001 supplies a read command and data of an address storing the generation limit counter (SLC) to the read/write circuit 901, and causes the read/write circuit 901 to transmit the command and data to the RFID tag 100. The read/write circuit 901 receives the generation limit counter (SLC) transmitted from the RFID tag 100, and outputs the received generation limit counter (SLC) to the CPU 1001. The CPU 1001 stores the received generation limit counter (SLC) in the RAM 1002.

In step S1310, the CPU 1001 determines whether original read is limited. For example, the CPU 1001 reads out the value of the generation counter and the value of the generation limit counter from the RAM 1002, and determines whether the value of the generation counter exceeds the value of the generation limit counter. If YES in step S1310, the flow advances to step S1220. If NO in step S1310, the flow advances to step S1212 to execute an image reading process.

In step S1313, the CPU 1001 executes the same processing as in step S1206 of the first embodiment to acquire the value of a total counter from the RFID tag 100. After that, the CPU 1001 executes steps S1214 and S1216 to edit and write the total counter value.

In this embodiment as described above, image read of a grandchild original or the like can be limited. In particular, a decrease in image quality during copying can be prevented by setting the value of the generation limit counter to such an extent that the quality of an original image cannot be maintained.

Third Embodiment

In the first embodiment, the value of the total limit counter is read out from the RFID tag 100 attached to an original. However, it is also possible to prestore the value of the total limit counter in the RAM 1002 or EEPROM of the image reading apparatus 900, and compare this stored value with the value of the total counter.

Also, in the second embodiment, the value of the generation limit counter is read out from the RFID tag 100 attached to an original. However, it is also possible to prestore the value of the generation limit counter in the RAM 1002 or EEPROM of the image reading apparatus 900, and compare this stored value with the value of the generation counter.

Fourth Embodiment

In the above embodiments, image read is inhibited by loading the counter value of the RFID tag 100 on an original, and comparing the loaded value with a predetermined threshold value.

This embodiment is further wherein if inhibition is already determined or if inhibition is determined by the current image reading process, an inhibit flag indicating read inhibition is written in an RFID tag 100 of an original.

For example, in step S1216 described above, a CPU 1001 writes an inhibit flag indicating read inhibition in address 06h. On the other hand, a step of reading out the inhibit flag and a step of determining whether image read is inhibited on the basis of the contents of the readout inhibit flag are inserted between steps S1202 and S1210 or between steps S1202 and S1310. If image read is inhibited, the flow advances to step S1220; if not, the above-mentioned limitation determination or the like is executed.

In this embodiment, data representing read inhibition is written in the RFID tag of an original whose read is inhibited. If this data indicates inhibition, the total counter reading process or generation counter reading process can be skipped to simplify the processing.

Fifth Embodiment

An image forming apparatus corresponding to the image reading apparatus explained in each of the above embodiments will be described below. This image forming apparatus herein explained can be a printer for a computer, or an image forming unit of a copying machine, multifunction machine, or facsimile apparatus. In either case, an image of an original read by the image reading apparatus described above is formed on a printing sheet in the image forming apparatus. In this embodiment, assume that an RFID tag is attached to a printing sheet. Also, this RFID tag can be attached to a printing sheet beforehand, or attached to a printing sheet in the image forming apparatus.

Figure 14:
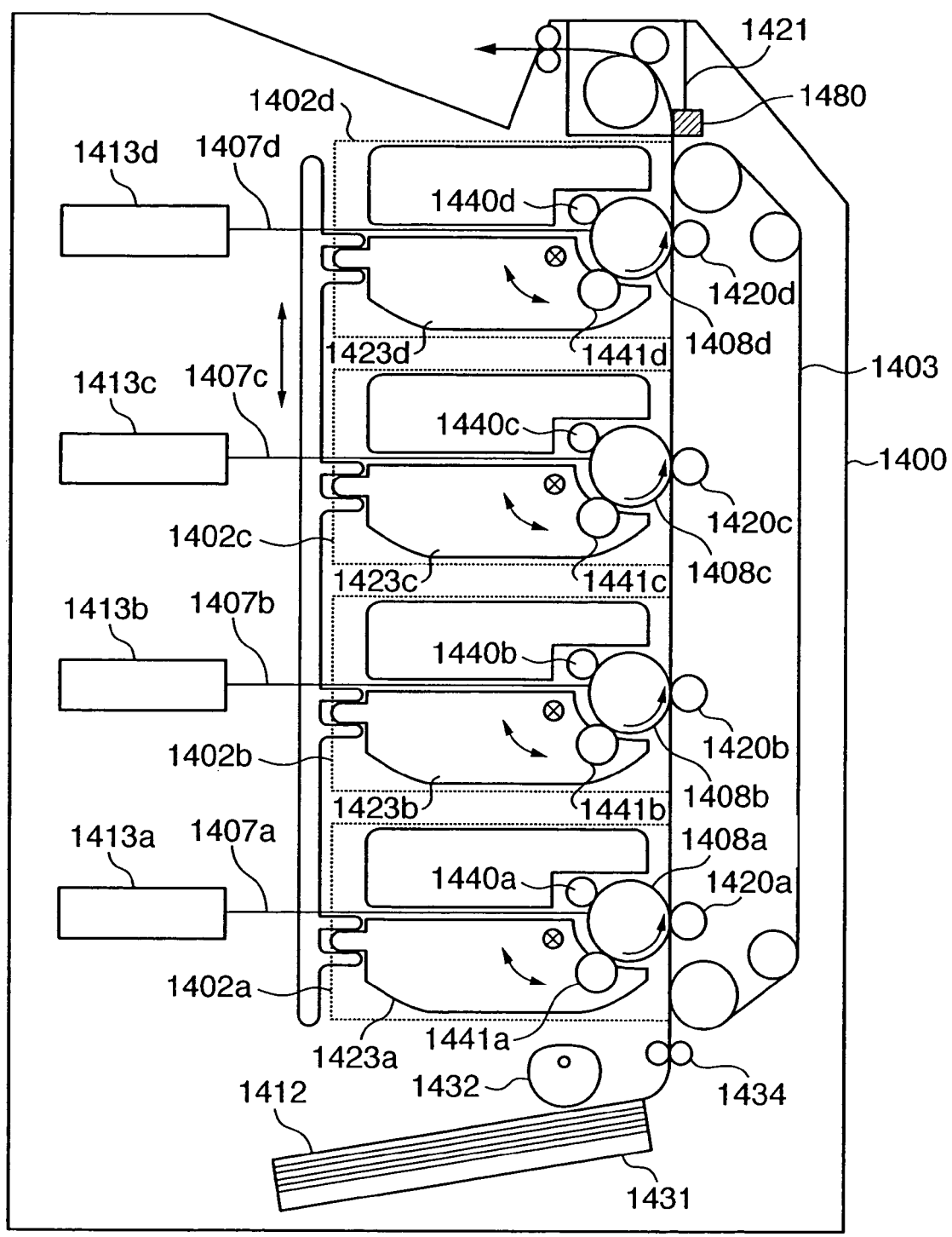
FIG. 14 shows a block diagram of an image forming apparatus 1400 according to the fifth embodiment.

FIG. 14 is a block diagram showing an image forming apparatus 1400 according to this embodiment. The image forming apparatus 1400 is an example of a multi-color image forming apparatus including image forming engines of four colors, i.e., cyan C, yellow Y, magenta M, and black K. a to d suffixed to reference numerals in FIG. 14 correspond to these four colors. Each of developing units 1402a to 1402d is a cartridge type unit having a photosensitive drum 1408, charging roller 1440, developing roller 1441, and developer container 1423. Each developing unit 1402 performs a process in which the charging roller 1440 charges the photosensitive drum 1408, a latent image is formed by a laser beam 1407 emitted from a laser scanner unit 1413, and a developed image is formed by developing the latent image by the developing roller 1441. Reference numeral 1431 denotes a paper feed cassette. When a paper feed request for a transfer medium 1412 is generated, a pickup roller 1432 picks up the transfer medium 1412 and feeds it to a paper feed roller 1434. Reference numeral 1403 denotes a conveyor belt for conveying the transfer medium 1412. At the position of a transfer roller 1420, the developed image formed on the photosensitive drum 1408 of the developing unit 1402 is transferred onto the transfer medium 1412 conveyed on the conveyor belt 1403. The transfer medium 1412 is then conveyed to a fixing unit 1421. The fixing unit 1421 melts and fixes the developer transferred onto the transfer medium 1412.

A read/write circuit 1480 writes data in an RFID tag 100 attached to a printing sheet, and reads out data from the RFID tag 100.

In step S1306 mentioned earlier, a generation counter (SC) is read out as generation information representing the generation of an original. A CPU 1001 reads out this value from a RAM 1002, and calculates the generation of an image to be formed on a printing sheet. For example, the CPU 1001 increments the value of the generation counter read out from the RAM 1002 by 1, and writes the incremented value in the RAM 1002.

When the image forming apparatus 1400 executes the process of forming an image on a printing sheet, the CPU 1001 reads out the value of the generation counter from the RAM 1002, and causes the read/write circuit 1480 of the image forming apparatus to write the readout generation counter value in the RFID tag 101 of the printing sheet. Note that the read/write circuit 1480 of the image forming apparatus is the same as the read/write circuit 901 described previously.

In this embodiment as described above, generation information of an image to be formed on a printing sheet can be written in the RFID tag. For example, when a parent (first-generation) original is to be read by the image reading apparatus to form a child (second-generation) original in the image forming apparatus, it is possible to read out a generation counter from the RFID tag of the parent original, and write the generation counter incremented by one generation into the RFID tag of the child original. In this manner, the generation of an image formed by the image forming apparatus can be managed.

Sixth Embodiment

In this embodiment, a technique of attaching an RFID tag to an original or printing sheet having no RFID tag attached will be explained.

Figure 15:
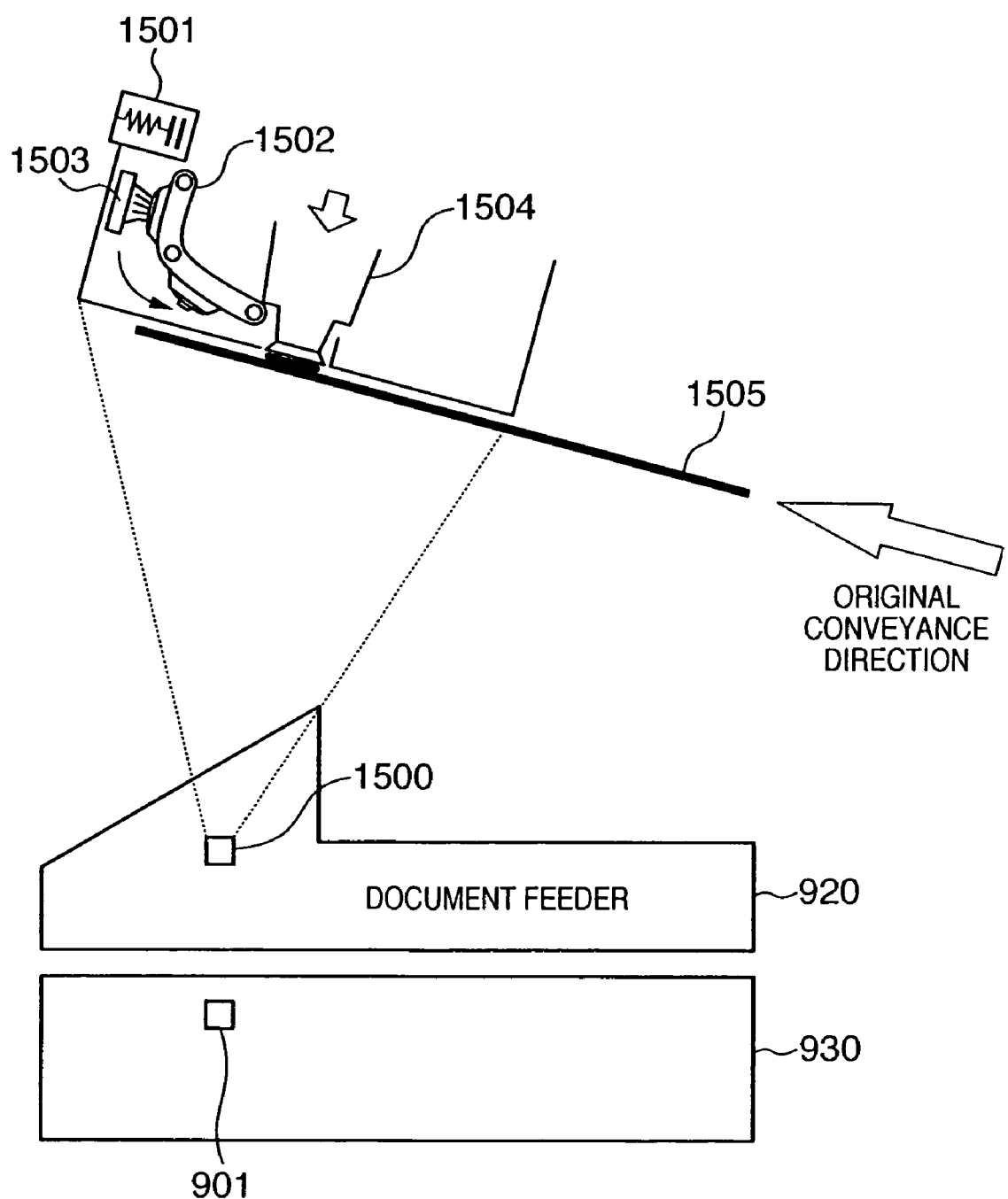
FIG. 15 shows a block diagram of an image reading apparatus according to the sixth embodiment.

FIG. 15 is a block diagram of an image reading apparatus according to the sixth embodiment. This image reading apparatus has an image reading unit (reader) 930 and document feeder 920. In the document feeder 920, an attaching unit 150 for attaching an RFID tag is placed in a document convey path. The attaching unit 1500 includes a tag magazine 1501, conveyor unit 1502, coating unit 1503, and pressing unit 1504. The tag magazine 1501 stores one or more RFID tags 100. The conveyor unit 1502 holds and conveys an RFID tag output from the tag magazine 1501. The coating unit 1503 coats the surface film of the RFID tag with an adhesive. The pressing unit 1504 presses the RFID tag coated with the adhesive against an original 1505.

Figure 16:
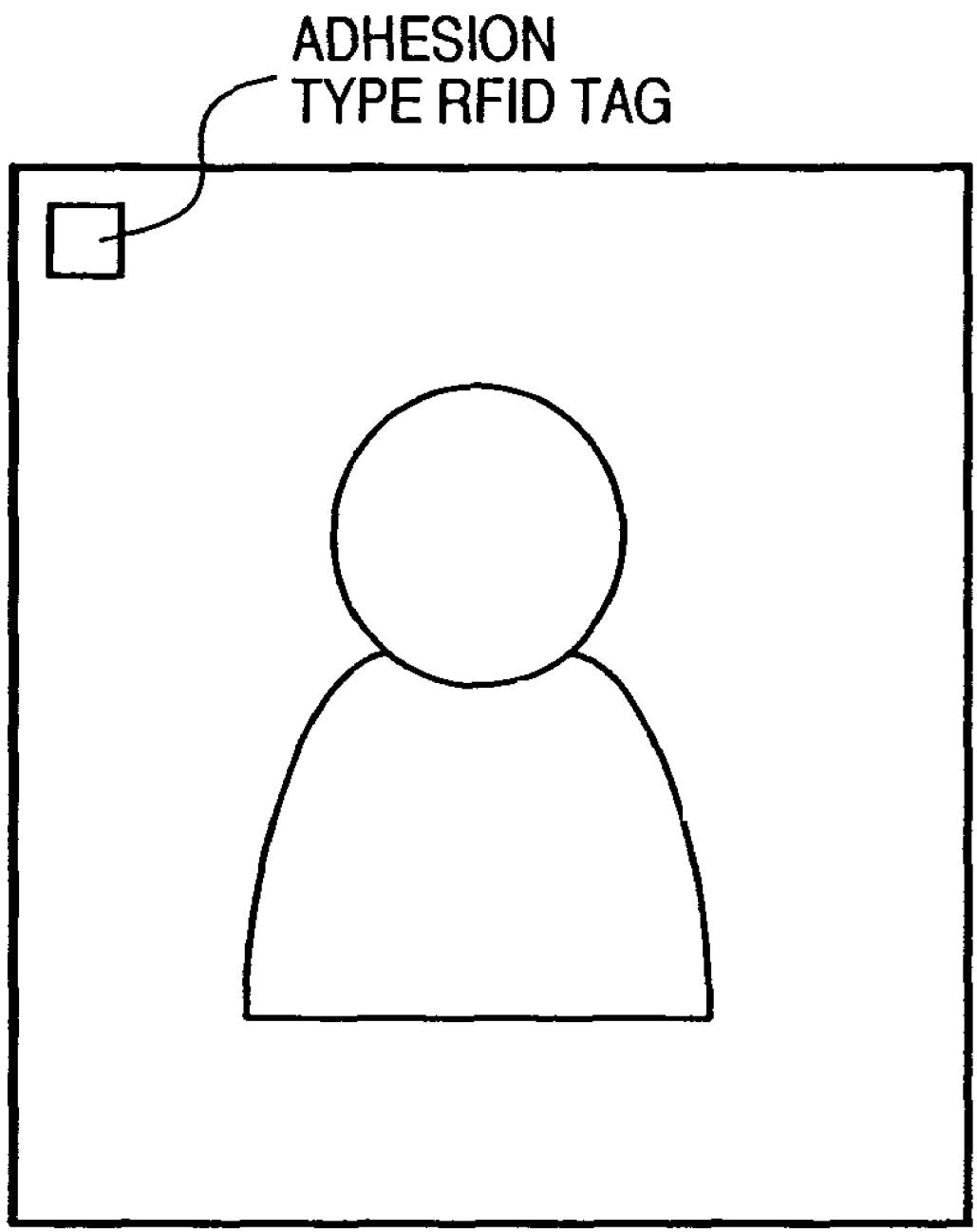
FIG. 16 shows an original to which an adhesion type RFID tag according to the sixth embodiment is attached.

FIG. 16 shows an original to which an adhesion type RFID tag according to the sixth embodiment is attached. This RFID tag can be attached to either the upper or lower surface of an original. When the RFID tag is to be attached to the upper surface of an original, it is desirably attached to an inconspicuous portion such as any of the four corners of the original. Alternatively, a CPU 1001 may also detect a portion having a color substantially the same as the color of the RFID tag, and perform control such that the RFID tag is attached on this portion having substantially the same color. It is also possible to adhere the RFID tag on an original in synchronism with an image reading process, or attach it when an original is placed on an original glass plate before image read.

Figure 17:
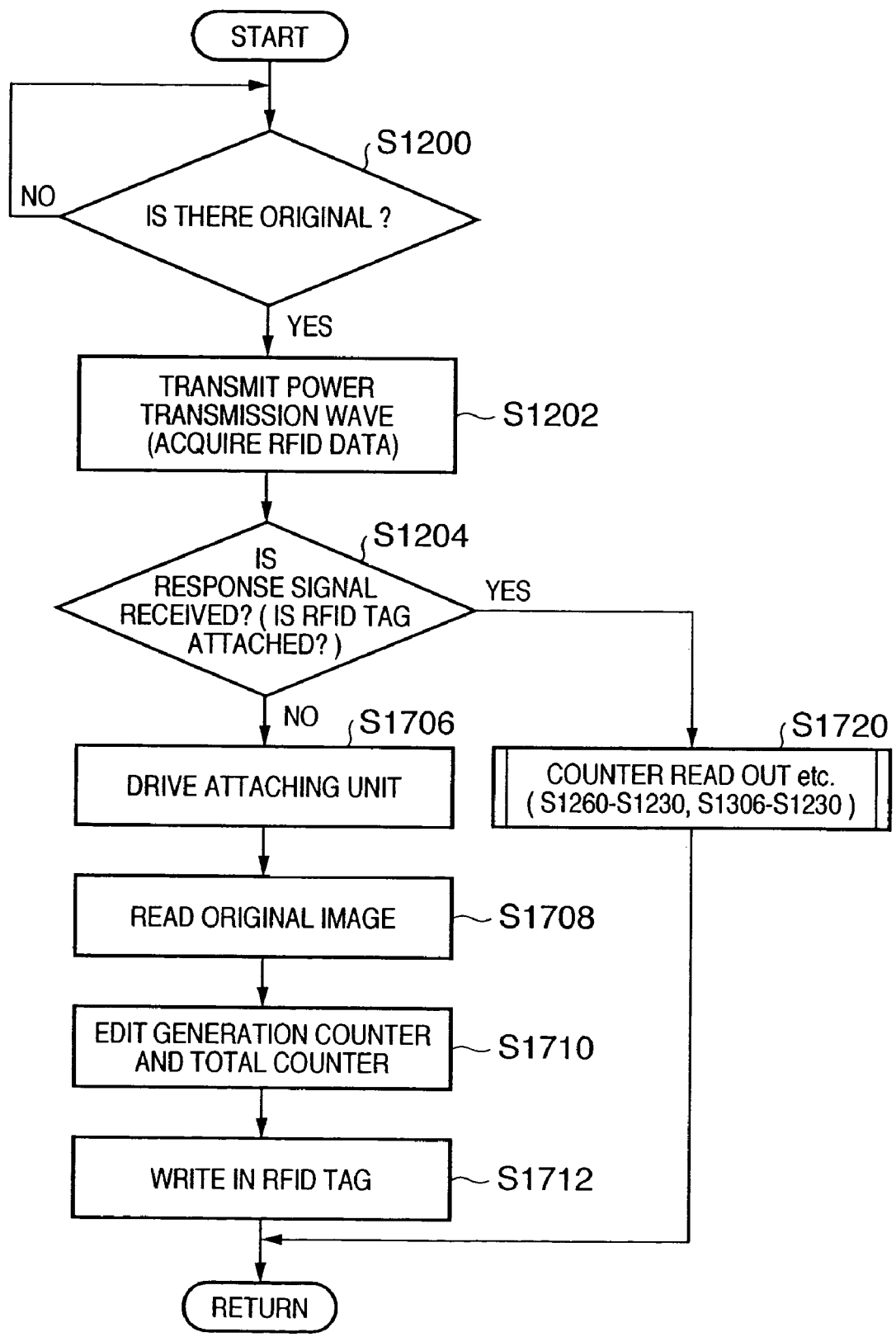
FIG. 17 shows a flowchart of a tag attaching process and image reading process according to the sixth embodiment.

FIG. 17 is a flowchart of a tag attaching process and image reading process according to this embodiment. The same reference numerals as in the above embodiments denote the already explained processes, and a description thereof will be omitted. In step S1204, the CPU 1001 determines whether a tag ID can be received as a response signal from the RFID tag 100, thereby determining whether an original has an RFID tag. If this original has an RFID tag, the flow advances to step S1720 to execute the processes in steps S1206 to S1230 or S1306 to S1230. If the original does not have the RFID tag 100, the flow advances to step S1706.

In step S1706, the CPU 1001 controls the document feeder 920 and attaching unit 1500 to adhere the RFID tag 100 on the original.

In step S1708, the CPU 1001 controls the image reading unit (reader) 930 to read an image from the original, forms image data by performing necessary image processing, and stores the image data in a RAM 1002.

In step S1710, the CPU 1001 edits the values of a generation counter and total counter, and stores the edited values in the RAM 1002. For example, the CPU 1001 sets the value of a generation counter SC to "11" which represents the current original, sets the value of a total counter TC to "1" which represents the first image reading process, and stores these values in the RAM 1002.

In step S1712, the CPU 1001 reads out SC and TC from the RAM 1002, outputs SC and TC to a read/write circuit 901, and causes the read/write circuit 901 to write these values in the RFID tag 100.

Note that the CPU 1001 may also read out original image data stored in the RAM 1002, and write the readout image data in the RFID tag 100.

It is also possible to execute the process of writing the counter values in the RFID tag 100 before the RFID tag is adhered on an original.

Although the process of adhering an RFID tag in the image reading apparatus is explained above, an RFID tag may also be adhered in the image forming apparatus described above.

In this embodiment as explained above, in the image reading apparatus or image forming apparatus, an RFID tag can be adhered on an original or printing sheet having no RFID tag attached. The process of limiting read of an original image can be executed by executing the processing according to any of the above embodiments.

Seventh Embodiment

In the sixth embodiment, it is possible to read an image of an original having no RFID tag by the image reading apparatus, attach an RFID tag to the original, and write data of the read image in this RFID tag.

When an operation by which a child original is formed by copying a parent original and a grandchild original is formed by copying the child original is repeated, the image quality of the original gradually deteriorates.

In this invention according to the seventh embodiment, therefore, when an RFID tag storing image data is attached to an original, this image data is read from the RFID tag instead of acquiring the image data by scanning the original. In this manner, it is possible to substantially maintain the image quality of the parent original.

Figure 18:
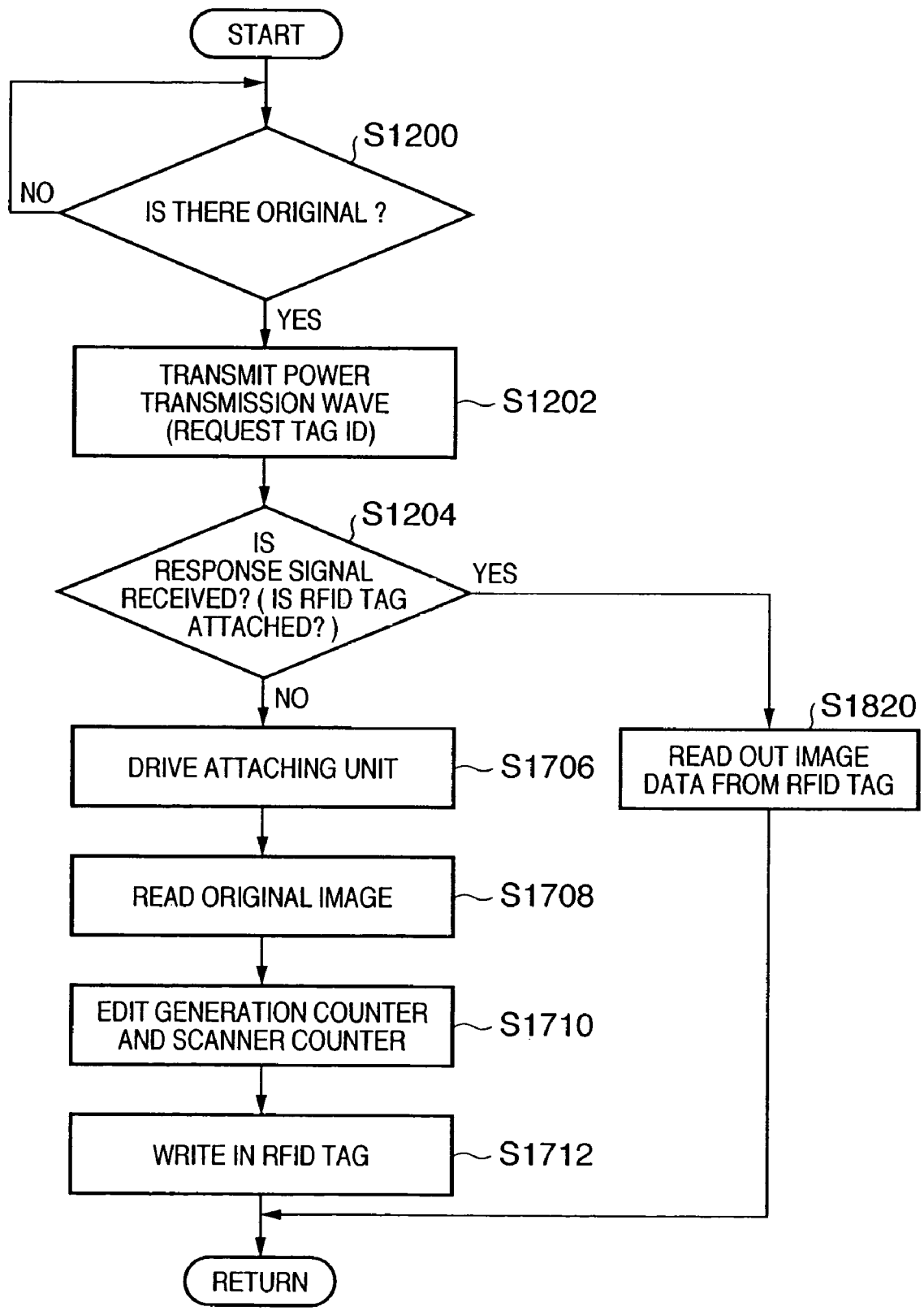
FIG. 18 shows a flowchart of an image reading process according to the seventh embodiment.

FIG. 18 is a flowchart of an image reading process according to this embodiment. The same reference numerals as in the above embodiments denote the already explained processes, and a description thereof will be omitted.

In step S1820, a CPU 1001 controls a read/write circuit 901 to read out image data from an RFID tag 100 attached to an original, and store the readout image data in a RAM 1002.

In this embodiment, image data of an original is held in an RFID tag, and, when an image of the original is to be read, the image data of the original is read out from the RFID tag. In this way, the image quality of the parent original can be maintained. Generally, an image printed on a printing sheet changes with time or becomes dirty and thereby deteriorates the image quality. If this deteriorated original is read, the image quality of the parent original cannot be maintained. When image data of the parent original is held in an RFID tag as in this embodiment, the image quality of the parent original can be maintained for any length of time.

In this embodiment as described above, information which helps control original read and image formation is stored in an RFID tag attached to an original. This makes it possible to control image read and image formation by, e.g., limiting a predetermined number of times of image read or more or limiting a predetermined number of generations of image read or more.

Eighth Embodiment

Japanese Patent Laid-Open No. 2002-337426 mentioned earlier discloses a method of preventing unauthorized copying of an image printed on paper. More specifically, a user ID number and the like are written in an RFID tag on a transfer sheet, thereby relating personal information to a sheet on which an image is printed, and preventing unauthorized use of image information.

Unfortunately, only predetermined data is stored in this RFID tag. For example, none of control information, process information, and position information during image formation and post-process information for a bundle of printing sheets after image formation is stored. These pieces of information are stored and managed in a RAM of an image forming apparatus. Therefore, when a printing sheet on which an image is formed is to be moved to another post-processing step and continuously processed, a user must manually input sheet information, and this makes the operation troublesome.

Also, in the conventional method, one RFID tag must be attached to each printing sheet. However, assuming that information pertaining to a print job by which printing is performed for a plurality of printing sheets is to be stored in an RFID tag, this information concerning the same print job is recorded in an RFID tag of each of the plurality of printing sheets. Originally, it is satisfactory to attach an RFID tag to one printing sheet per print job. In the above conventional method, however, expensive RFID tags are attached to all printed printing sheets, and this increases the printing cost.

The invention according to this embodiment has been made in consideration of the above situation, and provides an image forming apparatus which reduces the number of printing media to which RFID tags are attached and thereby reduces the use amount of RFID tags, and a method of controlling the apparatus.

This invention also provides an image forming apparatus which acquires highly reliable personal information by using biometrics such as fingerprint verification or retina pattern verification, and stores the acquired personal information in an RFID tag of a printing medium on which an image is formed, and a method of controlling the apparatus.

Figure 19:
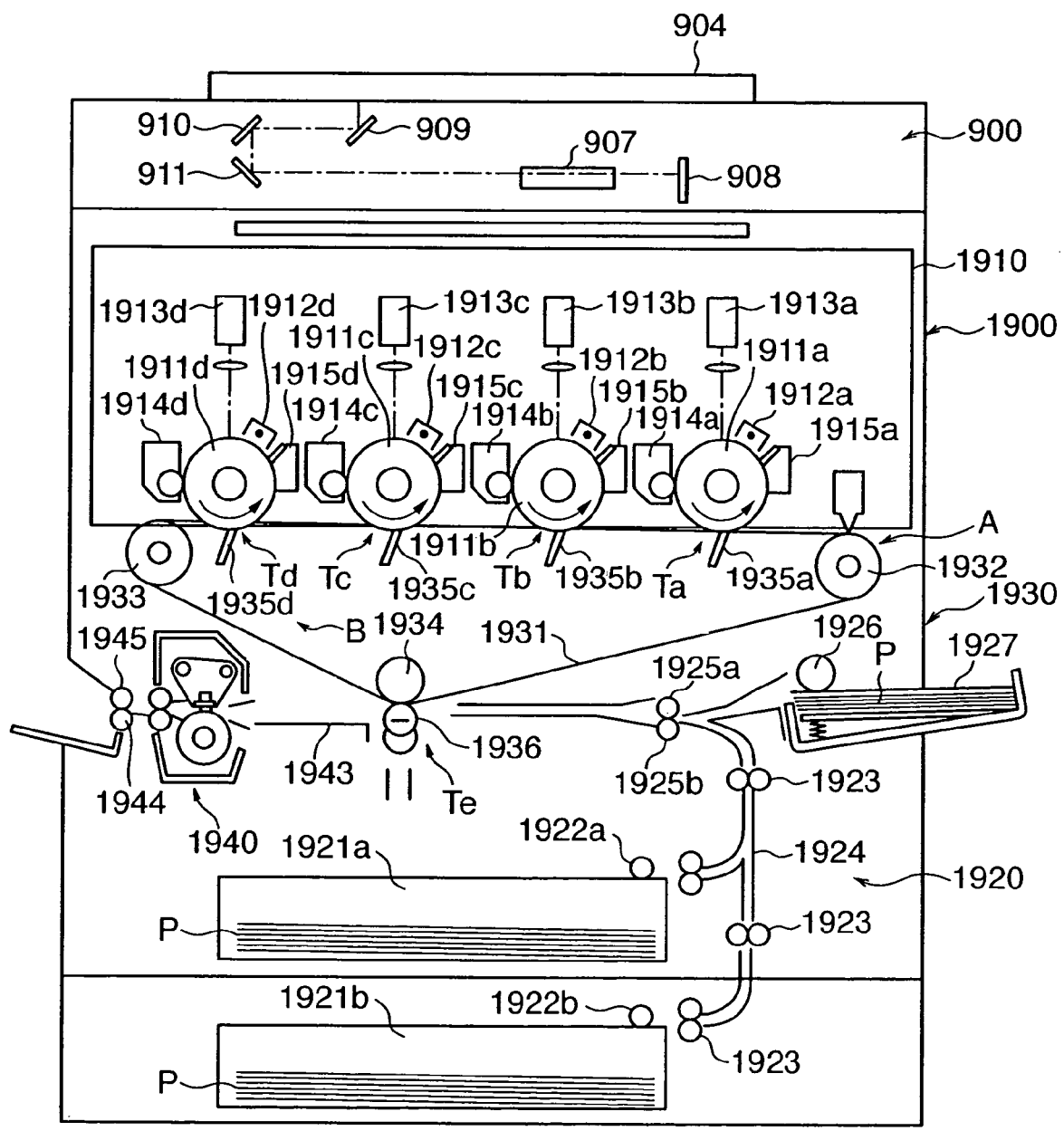
FIG. 19 shows a structural sectional view for explaining the arrangement of an image forming system according to the eighth embodiment.

FIG. 19 is a sectional view showing an example of an image forming system (copying machine) according to this embodiment. FIG. 19 shows an example of a system in which an image forming apparatus (printer) and image data input apparatus (scanner) are physically integrated. However, this system is merely an example, so these apparatuses may also be separately arranged. The same reference numerals as in the above embodiments denote the same parts, and a detailed explanation thereof will be omitted.

In FIG. 19, reference numeral 900 denotes a scanner (reader) as an image data input apparatus; and 904, a press plate of an original glass plate. The scanner 900 includes an original illuminating lamp (not shown), mirrors 909, 910, and 911, a lens 907, and an image sensor (CCD) 908. When an original image reading process is started in the scanner 900, an image of reflected light from an original is formed on the image sensor (CCD sensor) 908 via the scanning mirrors 909 to 911 and lens 907. An ADF (Automatic Document Feeder) or the press plate 904 is mounted on the scanner 900.

An image forming apparatus (printer) 1900 will be described next. The image forming apparatus 1900 is roughly made up of an image forming unit 1910 (in which four stations (a, b, c, and d) having the same arrangement are juxtaposed), paper feed unit 1920, intermediate transfer unit 1930, fixing unit 1940, and control unit (including a CPU 2071 (FIG. 20) and the like).

The individual units will be described in detail below. The image forming unit 1910 has the following arrangement. That is, each of photosensitive drums 1911a, 1911b, 1911c, and 1911d is axially supported at the center and rotated in the direction of an arrow. Primary chargers 1912a, 1912b, 1912c, and 1912d, optical systems 1913a, 1913b, 1913c, and 1913d, and developing units 1914a, 1914b, 1914c, and 1914d are arranged to oppose the outer circumferential surfaces of the photosensitive drums 1911a, 1911b, 1911c, and 1911d, respectively, from the upstream side in the rotational direction. Each of the primary chargers 1912a to 1912d gives electric charge having a uniform charge amount to the surface of the corresponding one of the photosensitive drums 1911a to 1911d. Each of the optical systems 1913a to 1913d exposes the corresponding one of the photosensitive drums 1911a to 1911d to a light beam such as a laser beam modulated in accordance with an image signal corresponding to each color, thereby forming an electrostatic latent image corresponding to the image signal of each color. The developing units 1914a to 1914d containing developers (toner components) of four colors, i.e., yellow, cyan, magenta, and black develop the electrostatic latent images by these four colors. In this embodiment, the developing units 1914a, 1914b, 1914c, and 1914d contain black toner, magenta toner, cyan toner, and yellow toner, respectively.

Cleaning devices 1915a, 1915b, 1915c, and 1915d are arranged on the drum surfaces downstream of image transfer regions Ta, Tb, Tc, and Td, respectively, in which the developed visible images are transferred onto an intermediate transfer belt 1931. The cleaning devices 1915a to 1915d clean the drum surfaces by scraping off toner untransferred to the transfer medium and remaining on the photosensitive drums 1911a to 1911d. Images of the different toner components are sequentially formed by the above process.

The paper feed unit 1920 includes cassettes 1921a and 1921b and a manual feed tray 1927 containing printing media P, pickup rollers 1922a, 1922b, and 1926 for picking up the printing media P one by one from the cassette or manual feed tray, a pair of paper feed rollers 1923 and a paper feed guide 1924 for conveying the printing medium P fed from each pickup roller to registration rollers, and registration rollers 1925a and 1925b for feeding the printing medium P to a secondary transfer region Te in synchronism with the image print timing of the printer 1900.

Details of the intermediate transfer unit 1930 will be explained below. The intermediate transfer belt 1931 (made of, e.g., PET (PolyEthyleneTerephthalate) or PVdF (PolyVinylidene Fluoride)) is wound around a driving roller 1932, tension roller 1933, and driven roller 1934. The driving roller 1932 transmits driving force to the intermediate transfer belt 1931. The tension roller 1933 gives an appropriate tension to the intermediate transfer belt 1931 by the biasing force of a spring (not shown). The driven roller 1934 opposes the secondary transfer region Te with the belt 1931 between them. A primary transfer plane A is formed between the driving roller 132 and tension roller 1933. The driving roller 1932 is obtained by coating the surface of a metal roller with rubber (urethane or chloroprene) having a thickness of a few mm, in order to prevent a slip with the belt 1931. The driving roller 1932 is rotated by a pulse motor (not shown). In the primary transfer regions Ta to Td in which the photosensitive drums 1911a to 1911d oppose the intermediate transfer belt 1931, primary transfer blades 1935a to 1935d are arranged at the back of the intermediate transfer belt 1931. Also, a secondary transfer roller 1936 faces the driven roller 1934 to form the secondary transfer region Te by a nip with the intermediate transfer belt 1931. The secondary transfer roller 1936 is pressed against the intermediate transfer belt 1931 by an appropriate pressure. On the intermediate transfer belt 1931, a cleaning device for cleaning the image formation surface of the intermediate transfer belt 1931 is positioned downstream of the secondary transfer region Te. This cleaning device (not shown) includes a cleaner blade (made of, e.g., polyurethane rubber), and a waste toner box for collecting waste toner.

The control unit includes a control board for controlling the operations of mechanisms in the individual units described above, a motor drive board, and the like.

When the printing sheet P on which an image is transferred in the second transfer region Te is conveyed, the fixing unit 1940 heats and presses the printing sheet P, thereby fixing the transferred image on the printing sheet. The printing sheet P on which the image is thus fixed is discharged outside the apparatus by the rotation of a pair of paper discharge rollers 1944 and 1945.

In this embodiment, an RFID tag attaching unit (to be described later) is positioned downstream of a conveyor portion from the fixing unit 1940. Details of this RFID attaching unit will be explained later.

Figure 20:
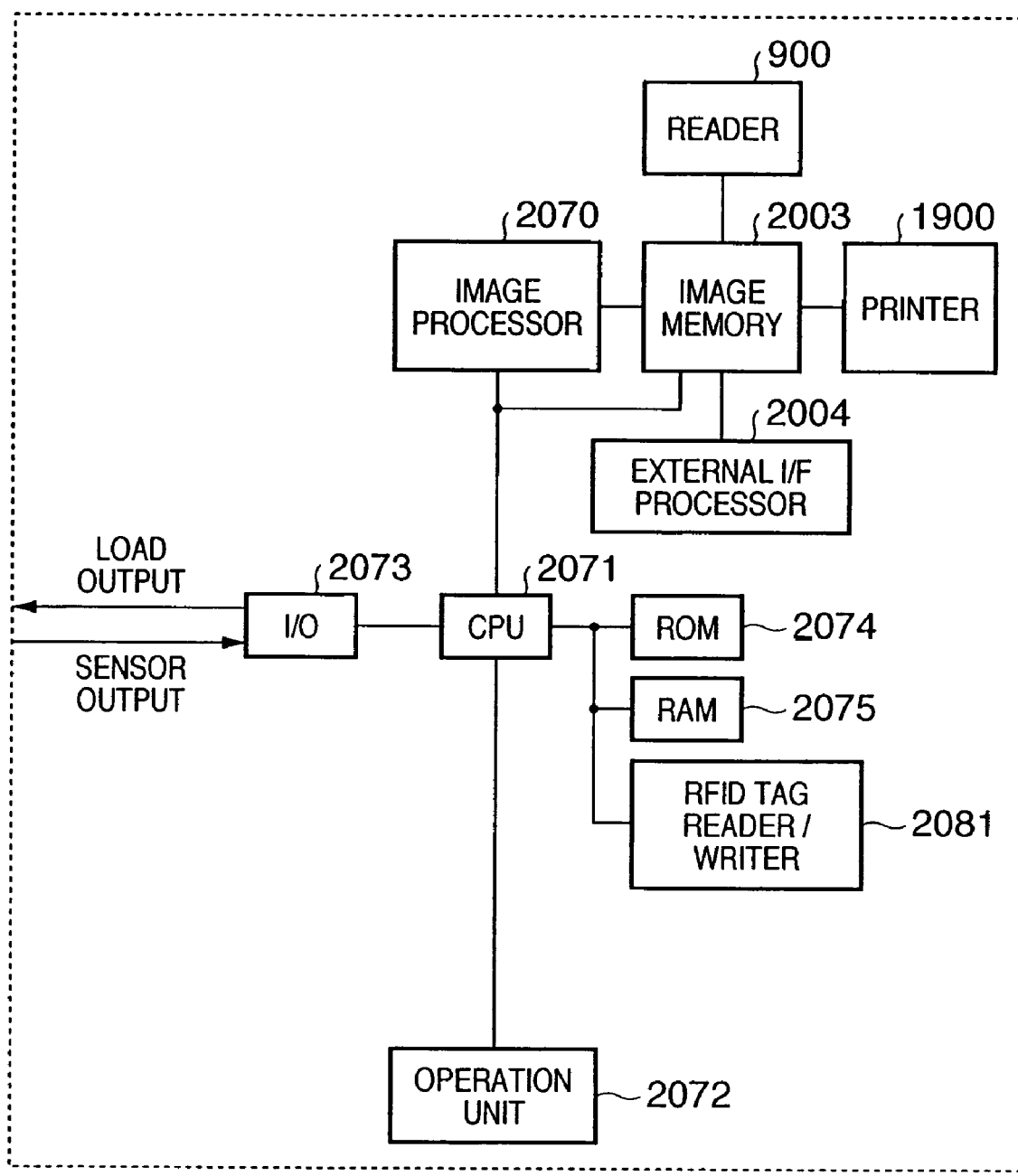
FIG. 20 shows a block diagram for explaining the functional configuration of the image forming system according to the eighth embodiment.

FIG. 20 is a block diagram for explaining the configuration of the image forming system according to this embodiment. Referring to FIG. 20, the CPU 2071 controls the overall operation of this image forming system. A control program of the CPU 2071 is written in a ROM 2074. A RAM 2075 is used as a work RAM for temporarily storing various data when the CPU 2071 performs a control operation. An I/O port 2073 is connected by an address bus and data bus of the CPU 2071. Various loads (not shown) such as motors and clutches for controlling this image forming system and inputs (not shown) from, e.g., a sensor for sensing the position of a printing sheet are connected to the I/O port 2073.

In accordance with the control program stored in the ROM 2074, the CPU 2071 controls inputting and outputting via the I/O port 2073, and executes an image forming operation. The CPU 2071 is also connected to an operation unit 2072, and controls display on a display portion of the operation unit 2072 and inputting of key signals from a key input portion of the operation unit 2072. From this key input portion, an operator instructs the CPU 2071 to switch image forming (printing) operation modes and display contents. The CPU 2071 sets an operation mode and displays data in accordance with the status of this image forming system or key inputting.

The CPU 2071 is further connected to an image processor 2070 which processes an image signal converted into an electrical signal by the image sensor 908 of the reader 900, and an image memory 2003 which stores images processed by the image processor 2070. The image memory 2003 is connected to the reader 900, an external I/F processor 2004, and the printer 1900.

Image information of an original image read by the reader 900 undergoes predetermined image processing in the image processor 2070, and the processed image information is supplied to and stored in the image memory 2003. Printing data input to the external I/F processor 2004 from a host computer or the like is already processed, so this printing data is directly supplied to and stored in the image memory 3. Image data thus supplied to the image memory 2003 from the reader 900 or external I/F processor 2004 is supplied to the printer 1900 and printed on a printing sheet.

Figure 21:
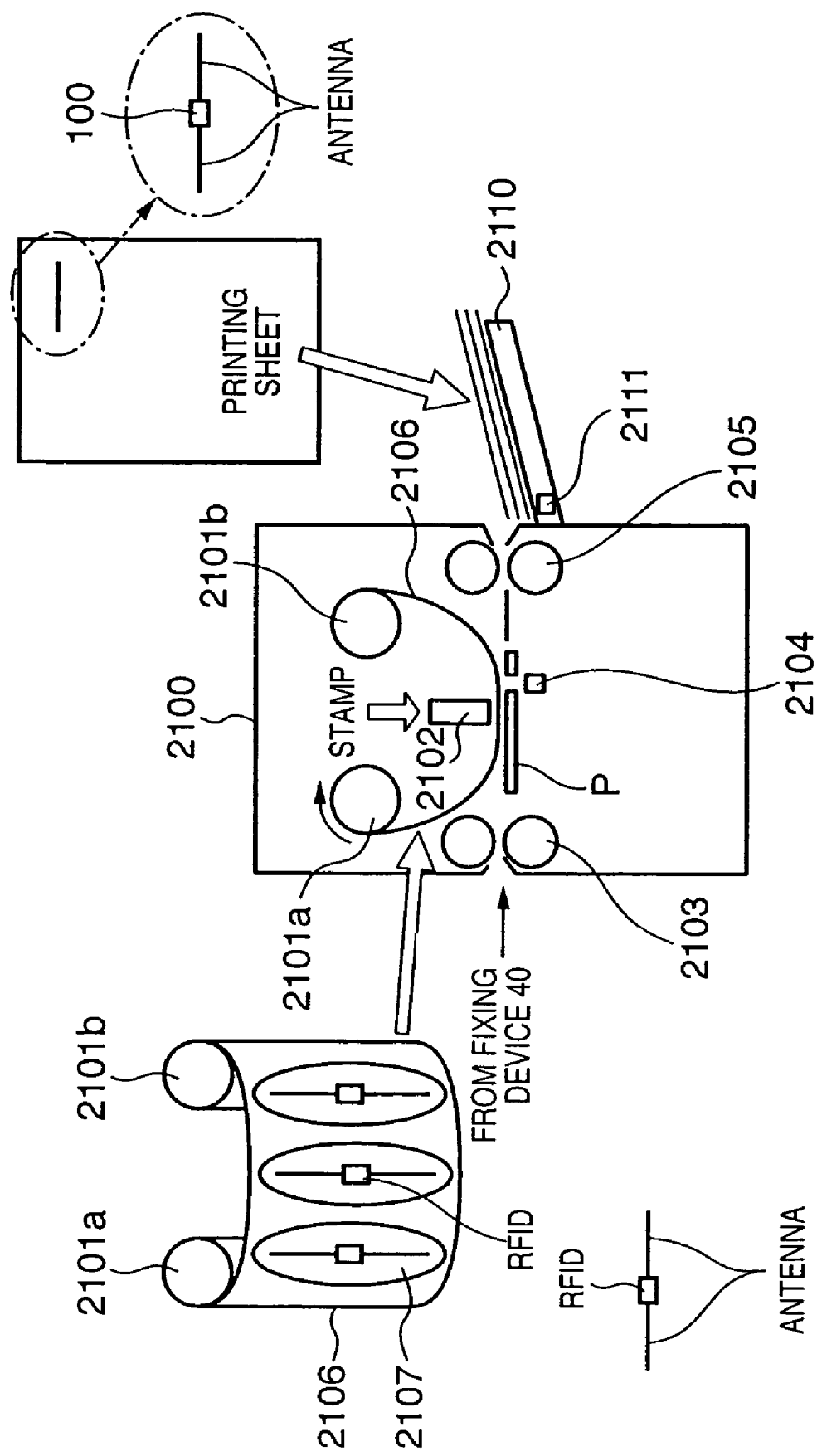
FIG. 21 shows a block diagram for explaining the arrangement of a unit for attaching a seal with an RFID tag according to the eighth embodiment.

An RFID tag reader/writer 2081 is equivalent to the read/write circuit 901 shown in FIG. 10. As shown in FIG. 21, the RFID tag reader/writer 2081 includes an RFID reader 2111 for reading the RFID tag 100 attached on an original, and an RFID tag writer 2104 for writing data in the RFID tag 100.

FIG. 21 is a view for explaining an RFID tag attaching unit 2100 for attaching an RFID tag on a printing sheet conveyed from a fixing device 1940 of the printer 1900 according to the embodiment.

The operation will be briefly described below. The printing sheet P on which a transferred image is fixed by the fixing device 1940 enters between a pair of rotating rollers 2103, and is conveyed to the position of a stamp unit 2102. In the stamp unit 2102, a roll sheet 2106 is extended to be conveyable in the direction of an arrow by rollers 2101a and 2101b. A seal 2107 with an RFID tag adhered on the roll sheet 2106 is adhered on the conveyed printing sheet P.

When the tag 100 is completely adhered, the roll sheet 2106 is conveyed until the next seal 2107 comes to the position at which adhesion is possible. Then, the roll sheet 2106 is stopped to prepare for adhesion of the seal 2107 to the next printing sheet P. The printing sheet P on which the RFID tag is thus adhered is further conveyed by the rotation of the pair of rollers 2103. During this conveyance, the RFID tag writer 2104 writes various digital data in the RFID tag 100. When the leading edge of the printing sheet P enters between a pair of discharge rollers 2105, the printing sheet P is conveyed by the rotation of the discharge rollers 2105 until the trailing edge of the printing sheet P passes by the discharge rollers 2105, and discharged onto the paper discharge tray 2110. The RFID reader 2111 can read the data written in the RFID tag 100 attached to the printing sheet P discharged to the paper discharge tray 2110. As described above, the RFID tag reader/writer 2081 corresponds to the RFID tag writer 2104 and RFID reader 2111.

In the above explanation, a seal with an RFID tag is adhered on the printing sheet P conveyed from the fixing device 1940. However, this step can, of course, be omitted if an RFID tag is attached to the printing sheet P beforehand, or if it is not particularly necessary to adhere any RFID tag.

FIG. 22 is a view for explaining the address map of a memory 101. Addresses 00h and 01h (h indicates a hexadecimal number) are used as areas for storing the ID of the RFID tag itself. Address 02h is used as a page number storage area. Address 03h stores a sheet size. Address 10h stores "post-processing mode setting". Address 11h stores "post-processing log". Address 12h stores "total number of pages" of the job. Address 13h stores "representative size of bundle". *Address* 14h stores "bundle state".

"Post-processing mode" includes setting which indicates whether to bind printed sheets for each predetermined bundle. "Total number of pages" indicates the number of pages forming one bundle. "Bundle state" includes information indicating, e.g., whether various sizes of sheets are mixed in the bundle. "Representative size" defines a maximum sheet size contained in the bundle.

As described above, when data read and write to the memory 101 are performed in accordance with the predetermined address map, invisible information other than image information can be held on a printing sheet. In the RFID tag 100 thus embedded in a printing sheet, invisible data can be written in a non-contact manner by radio by the RFID tag reader/writer 2081. It is also possible to read out the written data. The explanation of the operation of the RFID tag 100 is completed.

Note that the RFID tag reader/writer 2081 having the above-arrangement can transmit data, which is transmitted under the control of the CPU 2071, from a coil 501 after modulating the data by ASK, or can decode ASK-modulated data received from the coil 501. The explanation of the RFID tag reader/writer 2081 is completed.

In the RFID tag 100 attached to a printing sheet as described above, about 4.2 billion different types of printing sheets can be independently managed by at least the information in addresses 00h and 01h shown in FIG. 22, i.e., the tag ID. Additionally, "page number", "sheet size code", "post-processing mode setting", "post-processing log", "total number of pages" of the job, "representative size code" of the bundle, and "bundle state" are written in addresses 02h, 03h, 10h, 11h, 12h, 13h, and 14h, respectively.

Figure 23:
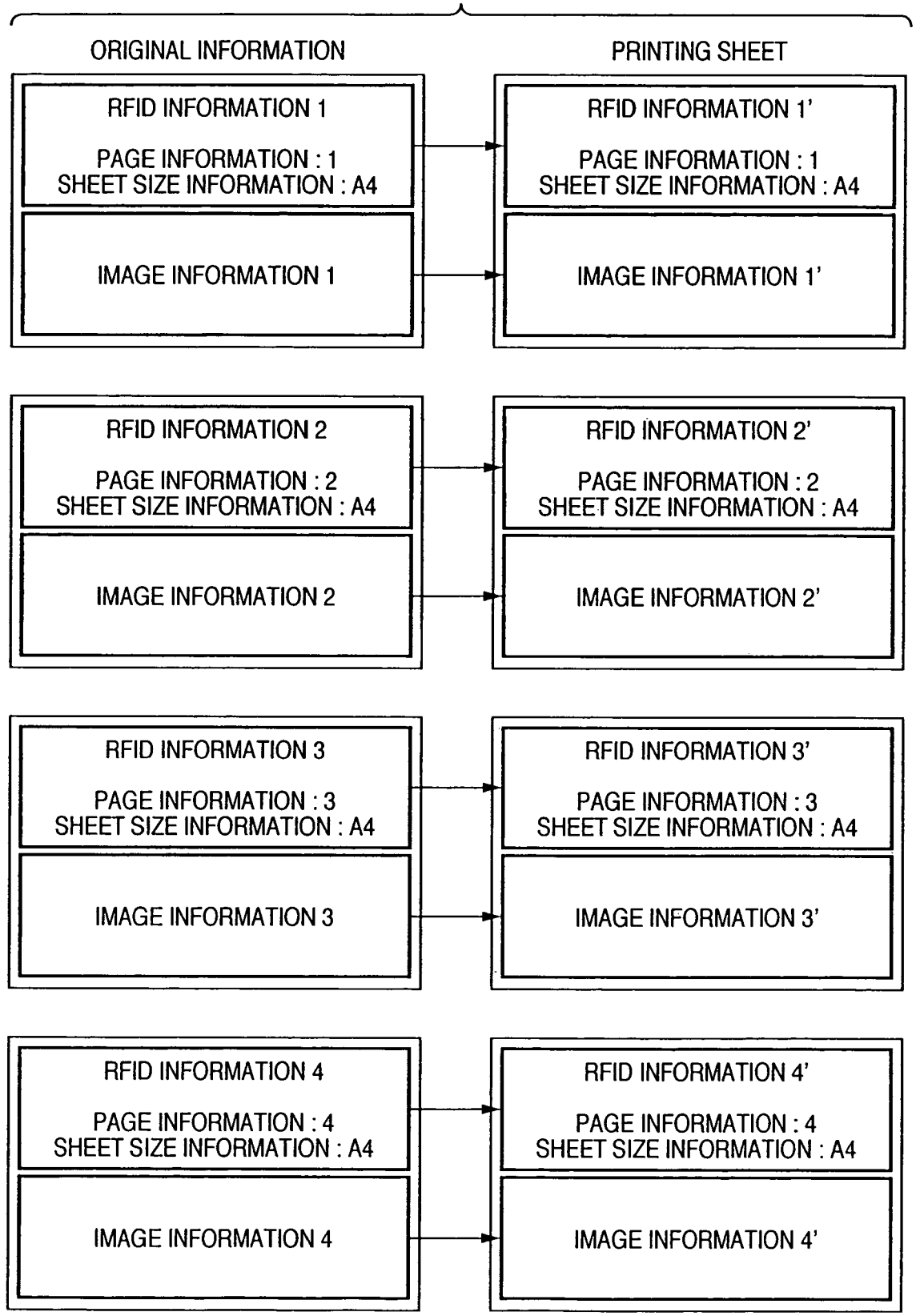
FIG. 23 shows a view for explaining a conventional example in which an original image is copied on a printing sheet.

FIG. 23 is a view for explaining an example of write of the conventional RFID tag data. In this example, the contents of an A4-size document having a total number of pages of four (four sheets) are printed on four A4-size pages (four sheets). Image information loaded from each original is printed on each printing sheet, and digital information (page information and size information) stored in an RFID tag on the original is directly written in an RFID tag on the printing sheet. This process is executed for all originals to give the RFID tags 100 to all the corresponding printing sheets.

Figure 24:
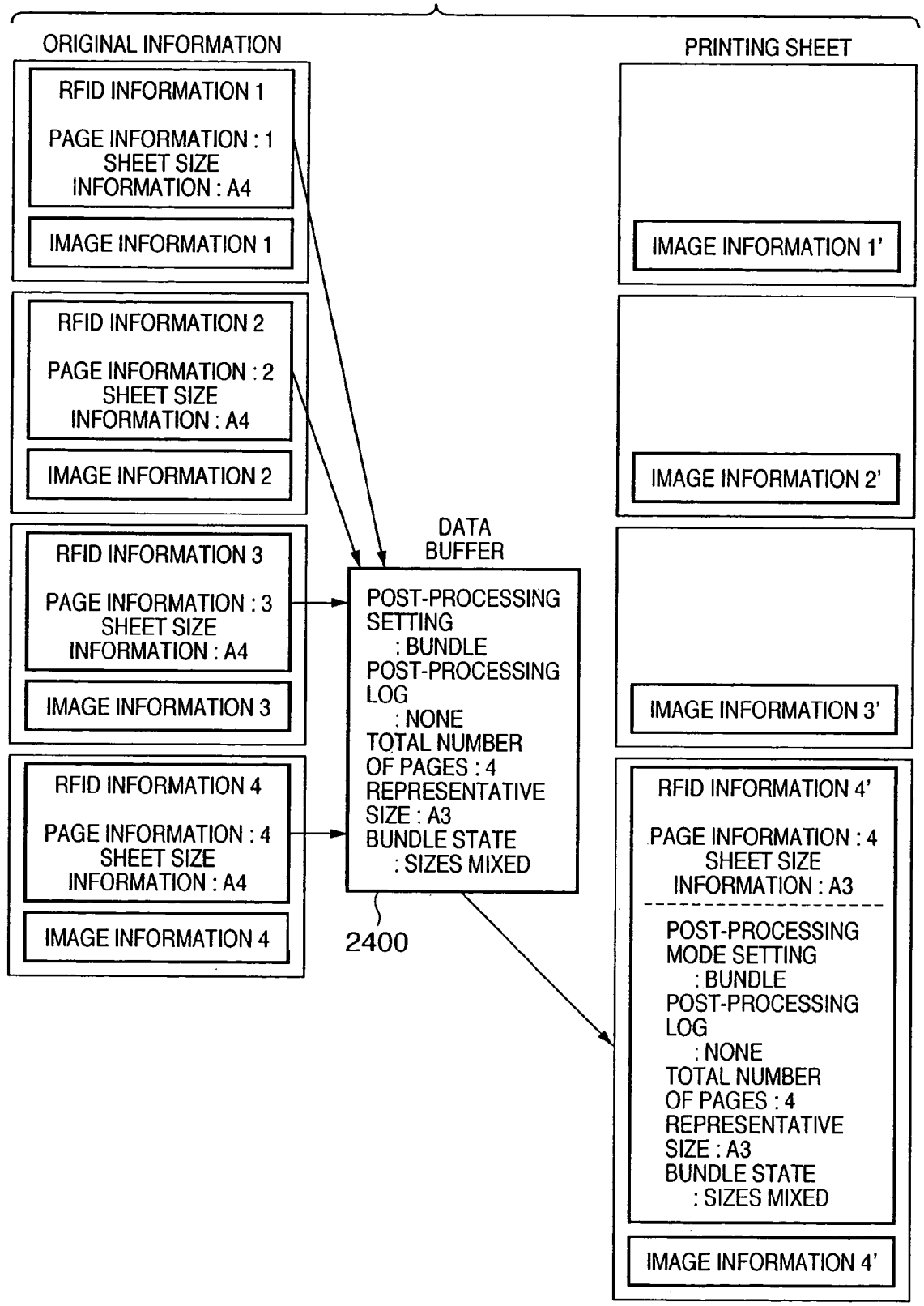
FIG. 24 shows a view for explaining an example according to the eighth embodiment in which an original image is copied on a printing sheet.

FIG. 24 is a view for explaining an example of write of the RFID tag data according to the embodiment. Referring to FIG. 24, printing of image information of an original to a printing sheet is the same as the prior art shown in FIG. 23, so a detailed description thereof will be omitted.

In FIG. 24, page information and sheet size information stored in the RFID tag 100 on an original are once stored in a data buffer 2400 (of the RAM 2075) for editing the data of the RFID tag 100. That is, in this example, it is determined on the basis of information of an RFID tag attached to the first original that four original images including the first original are to be bundled. Therefore, RFID tag data concerning the four original images corresponding to the bundle is stored in the data buffer 2400. When printing is performed on the fourth printing sheet as the last page of the bundle, an RFID tag is attached only to this printing sheet, and the tag information stored in the data buffer 2400 is written in the RFID tag 100.

Figure 25:
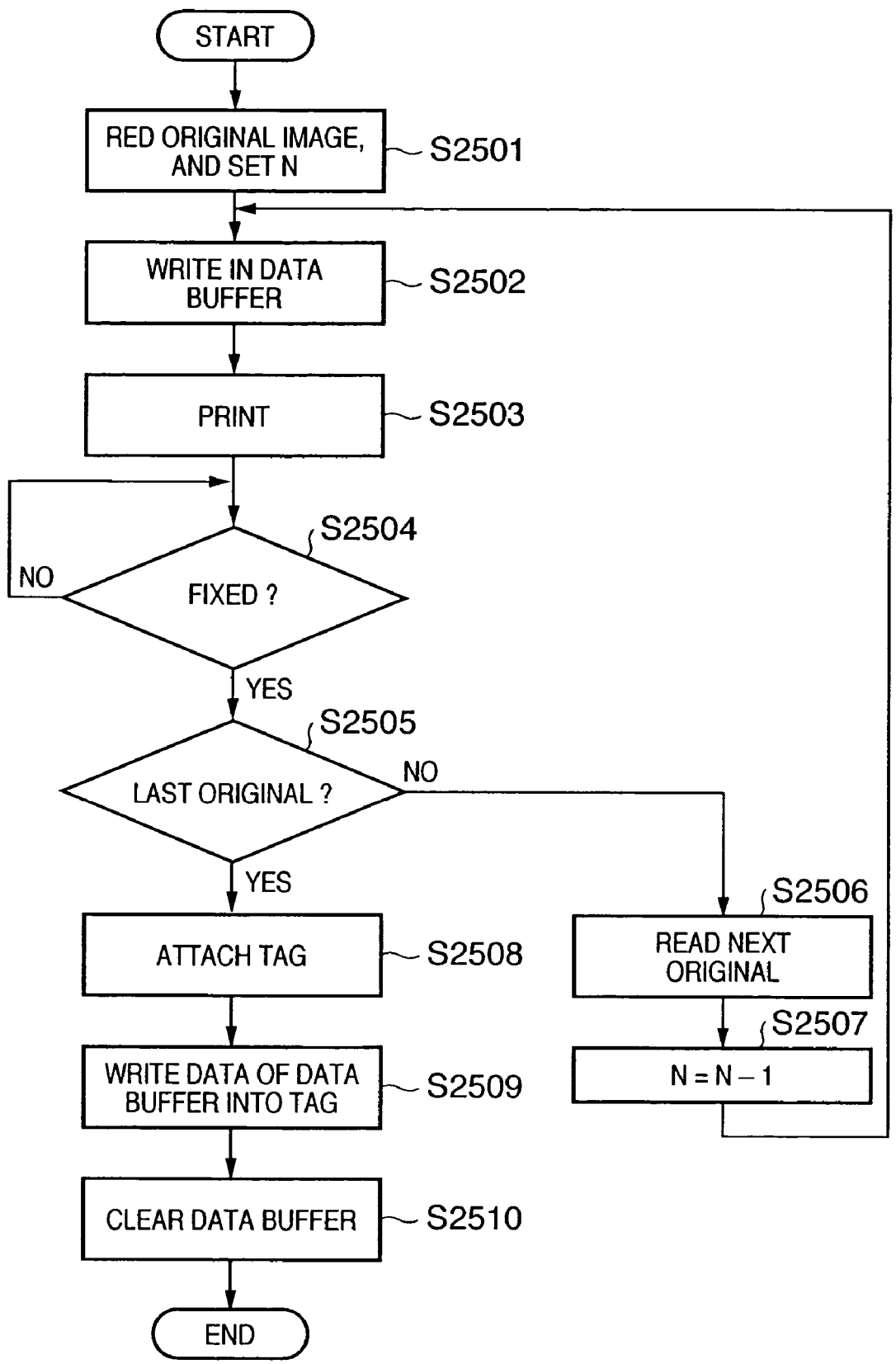
FIG. 25 shows a flowchart for explaining an RFID tag attaching process according to the eighth embodiment.

FIG. 25 is a flowchart for explaining the process of writing RFID tag data according to the embodiment of the present invention. A program for executing this process is stored in the ROM 2074, and executed under the control of the CPU 2071. The process will be explained by taking as an example a copying process by which an original image read by the reader 900 is printed by the printer 1900.

First, in step S2501, the reader 900 reads original images. In addition, tag information of a tag of the first original image is read to acquire the total number of pages (N). Then, the flow advances to step S2502 to write the tag information in the data buffer 2400 of the RAM 2075. In step S2503, the printer 1900 prints the image. In step S2504, whether the printed printing sheet is conveyed from the fixing device 1940 is determined. If the printing sheet is conveyed, the flow advances to step S2505 to determine whether the printed original image is the last original. That is, on the basis of the information of the RFID tag attached to the first original, the number of original images forming the bundle of the original images is determined, and whether the last original image of the bundle is read is determined. If NO in step S2505, the flow advances to step S2506, and the reader 900 reads the next original image. In step S2507, the total number of pages (N) is decremented by 1, and the flow returns to step S2502.

If YES in step S2505, the flow advances to step S2508, and the RFID tag 100 is adhered to the printed printing sheet P. The flow then advances to step S2509, and the RFID tag reader/writer 2081 writes the tag data stored in the data buffer 2400 into the RFID tag 100 of the last printing sheet. After that, the flow advances to step S2510 to erase the contents of the data buffer 2400.

In this embodiment as described above, even when RFID tags are attached to all original images, one RFID tag is attached to the last sheet of the bundle of these original images. This avoids attaching RFID tags to all printing sheets formed by copying original images, so the cost of image copying can be reduced.

Also, since a tag is attached only to a fixed printing sheet, it is possible to eliminate the inconvenience that a printing sheet having a tag attached is supplied to the fixing device.

Ninth Embodiment

Figure 26:
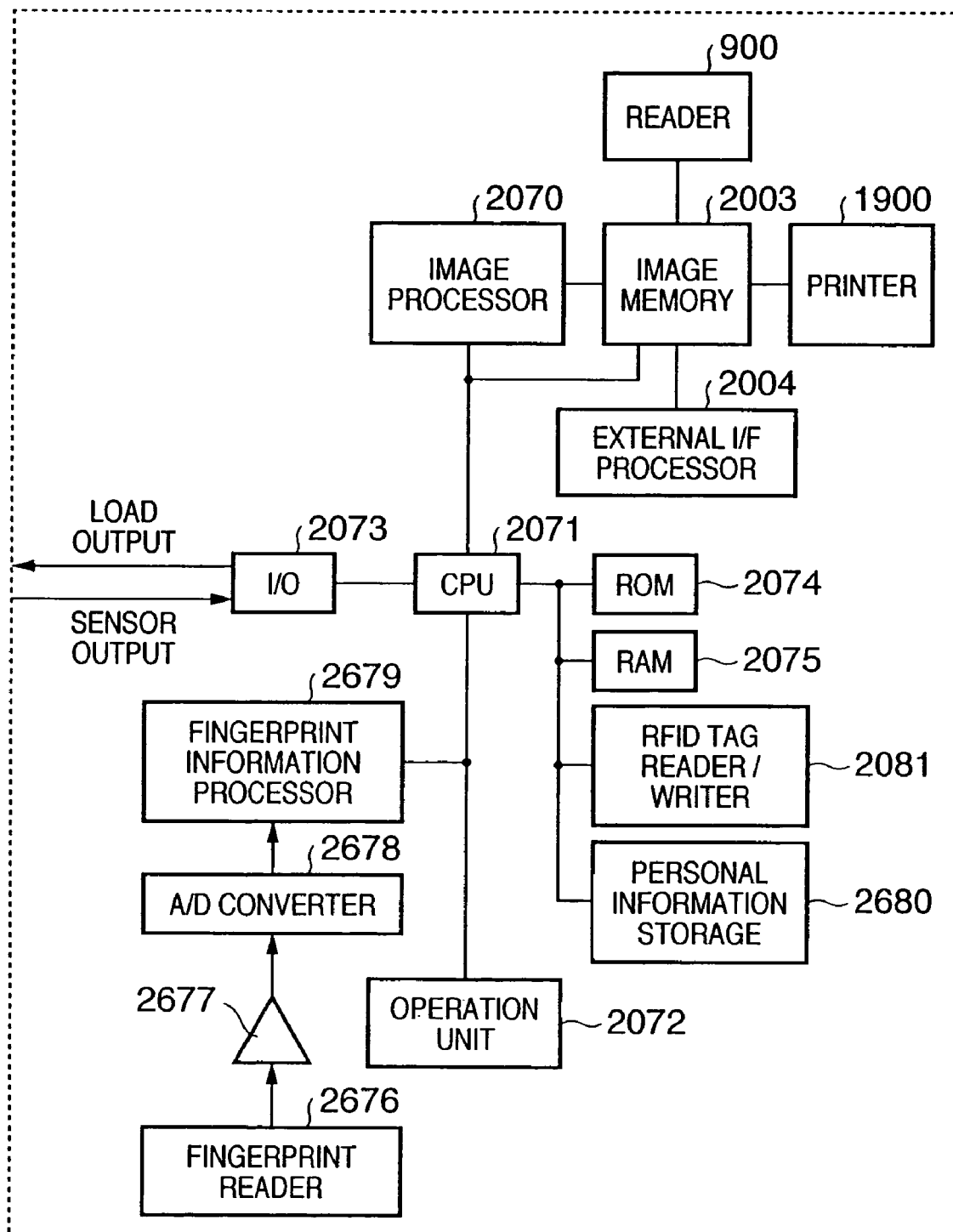
FIG. 26 shows a block diagram for explaining the functional configuration of an image forming system according to the ninth embodiment.

FIG. 26 is a block diagram for explaining the configuration of an image forming system according to the embodiment. The same reference numerals as in FIG. 20 denote the same parts.

Original image information loaded by a reader 900 undergoes predetermined image processing in an image processor 2070, and is supplied to and stored in an image memory 2003. Also, print image data input from a host computer or the like to an external I/F processor 2004 is directly supplied to and stored in the image memory 2003, since the data has already undergone image processing. The image data supplied from the reader 900 or external I/F processor 2004 to the image memory 2003 is further supplied to a printer 1900, and printed on a printing sheet.

A fingerprint reader 2676 reads a user's fingerprint by image sensing. An analog image signal corresponding to the user's fingerprint thus read is amplified by an amplifier 2677, and converted into digital data by an A/D converter 2678. This digital data is supplied to a fingerprint information processor 2679 where feature amount data of the fingerprint is extracted. A CPU 2071 rasterizes and temporarily stores the fingerprint feature amount data extracted by the fingerprint information processor 2679 into a RAM 2075.

If an RFID tag 100 does not support data write, to relate fingerprint feature amount data as user data currently being used to an output printing sheet, tag number data read out from an RFID tag to be attached to a printing sheet on which an image is to be output, fingerprint feature amount data, and a user ID related to fingerprint feature amount data of each individual beforehand are combined, and the combined data is stored in a personal information storage 2680.

By these processes, a printing sheet with an RFID tag and information of a user who has processed the sheet can be related.

Note that this embodiment will be explained by taking fingerprint information as an example of personal information, but the present invention is not limited to this embodiment. For example, the present invention is also applicable to retina pattern information, face photograph information, iris pattern information, and vein pattern information.

Figure 27:
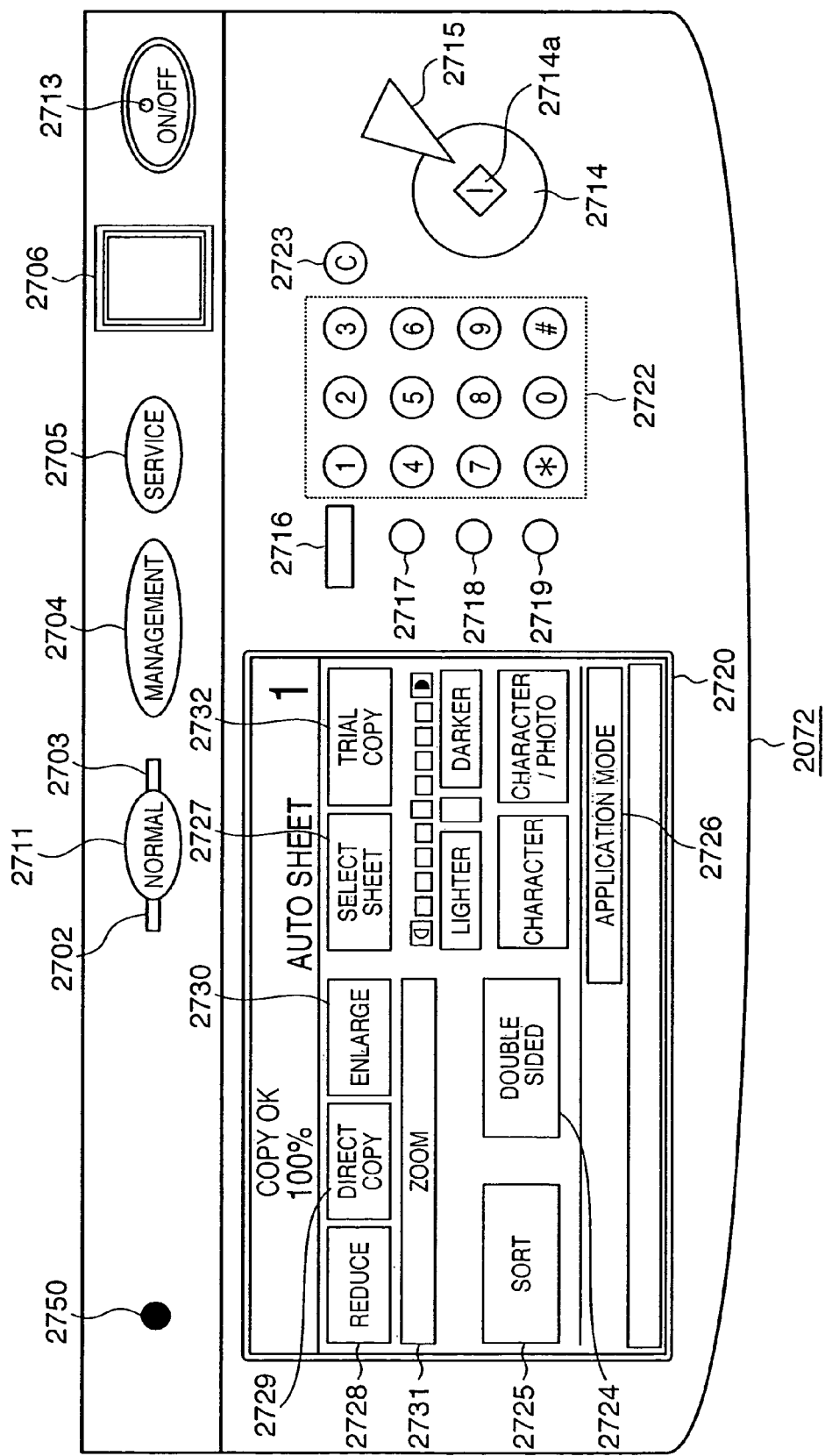
FIG. 27 shows the external appearance of an operation unit of the image forming system according to the ninth embodiment.

FIG. 27 is a schematic view for explaining an operation unit 2072 of the image forming system according to this embodiment. Referring to FIG. 27, a power lamp 2750 indicates that the power supply is ON. The power lamp 2750 is turned on and off in accordance with ON/OFF switching of the power supply by a power switch 2713. A ten-key pad 2722 is used to input numerical values in order to set the quantity of copies or a mode. A clear key 2723 clears the setting input by the ten-key pad 2722. A reset key 2716 returns the set quantity of copies, the set operation mode, or the set mode of a selected paper feed stage to a prescribed value. Reference numeral 2714 denotes a start key. A printing operation starts when the start key 2714 is pressed. In the center of the start key 2714, red and green LEDs 2714*a* for indicating whether the printing operation can be started are formed. If the printing operation cannot be started, the red LED is turned on. If the printing operation can be started, the green LED is turned on. A stop key 2715 is used to stop a copying operation. Reference numeral 2717 denotes a guide key. When a certain key is pressed after the guide key 2717 is pressed, an explanation of a function set by the certain key is displayed on a display unit 2720. This guide display is canceled when the guide key 2717 is pressed again. Reference numeral 2718 denotes a user set key. When the user set key 2718 is pressed, a user can change the settings of the image forming apparatus. The settings changeable by a user are those corresponding to general functions of both printing and copying, or those unique to individual functions, e.g., the time before a certain setting is automatically cleared, the timer settings, and the settings of dedicated trays. Reference numeral 2719 denotes an interrupt key. When the interrupt key 2719 is pressed during a printing operation, copying can be performed by interrupting the printing operation.

The display unit 2720 is made of a liquid crystal or the like, and the display contents change in accordance with the set mode in order to facilitate detailed mode setting. Also, the screen surface of this display unit is a touch sensor. FIG. 27 shows an example of a copying operation mode setting window.

In FIG. 27, keys 2724 to 2732 are displayed on the display unit 2720. A mode is set by detecting pressing of these keys when the display positions of the keys are touched. Reference numeral 2727 denotes a sheet stage select key. When the select key 2727 is pressed, the display unit 2720 displays a window for setting one of cassettes 1921*a* and 1921*b* and a manual feed tray 1927 from which sheets are to be fed. Reference numerals 2728 to 2731 denote keys for setting the copying magnification of a copying operation; and 2726, an application mode setting key. When the application mode setting key 2726 is pressed, a window for setting application function modes such as a reduced layout mode, cover paper mode, and combined paper mode is displayed. A double-sided operation setting key 2724 is used to set, e.g., three types of double-sided modes: "single-double mode" in which a double-sided sheet is output from a single-sided original, "double-double mode" in which a double-sided sheet is output from a double-sided original, and "double-single mode" in which two single-sided sheets are output from a double-sided original. Reference numeral 2725 denotes a sort key. When the sort key 2725 is pressed, the operation mode of a post-processing apparatus (not shown) or an output sheet sorting mode using an image memory is set.

If the mode of any key displayed on the display unit 2720 cannot be set, the display lines are not normally displayed but displayed as dotted lines (halftone lines) to indicate that the key cannot be operated. In the example shown in FIG. 27, the set contents of a copying operation and the current operation state are displayed in the upper portion of the display unit 2720. Reference numeral 2732 denotes a proof print mode key. When the sorting mode is set by the sort key 2725 and a plurality of copies are to be output, the proof print mode key 2732 sets a proof print mode in which when one copy is output, the printing operation is temporarily stopped to allow the user to check the quality of the copy. If the copy quality is OK, the printing operation is continued. If the copy quality is NG, the printing operation is stopped.

In FIG. 27, reference numerals 2701 to 2705 denote keys and LEDs for switching the displays of the operation unit 2072 in order to set normal operations such as copying and printing using the image forming system, set the system manager, and set the service maintenance operation. A normal operation set key 2711, system manager set key 2704, and service maintenance set key 2705 are keys for switching the individual functions. Each key is a semitransparent key button, and an indication lamp (not shown) such as an LED is formed inside the key. When an operation window is selected by pressing any of these keys, the internal lamp of the key is turned on. Control is performed such that only the internal lamp of the key corresponding to the selected operation function window is turned on, and the internal lamps of the other keys are kept off. Also, a green LED 2703 is positioned on the right side of the normal operation set key 2711 to indicate the operation status of the normal operation function. For example, as shown in FIG. 27, the green LED 2703 is turned on and off during a copy output operation. A red LED 2702 is positioned on the left side of the normal operation set key 2711 to indicate the occurrence of an abnormal status. For example, if abnormality such as interruption by the absence of paper or jamming occurs, the LED 2702 is turned on and off.

A fingerprint information sensor 2706 for reading user's fingerprint information is included in the fingerprint reader 2676.

Figure 28:
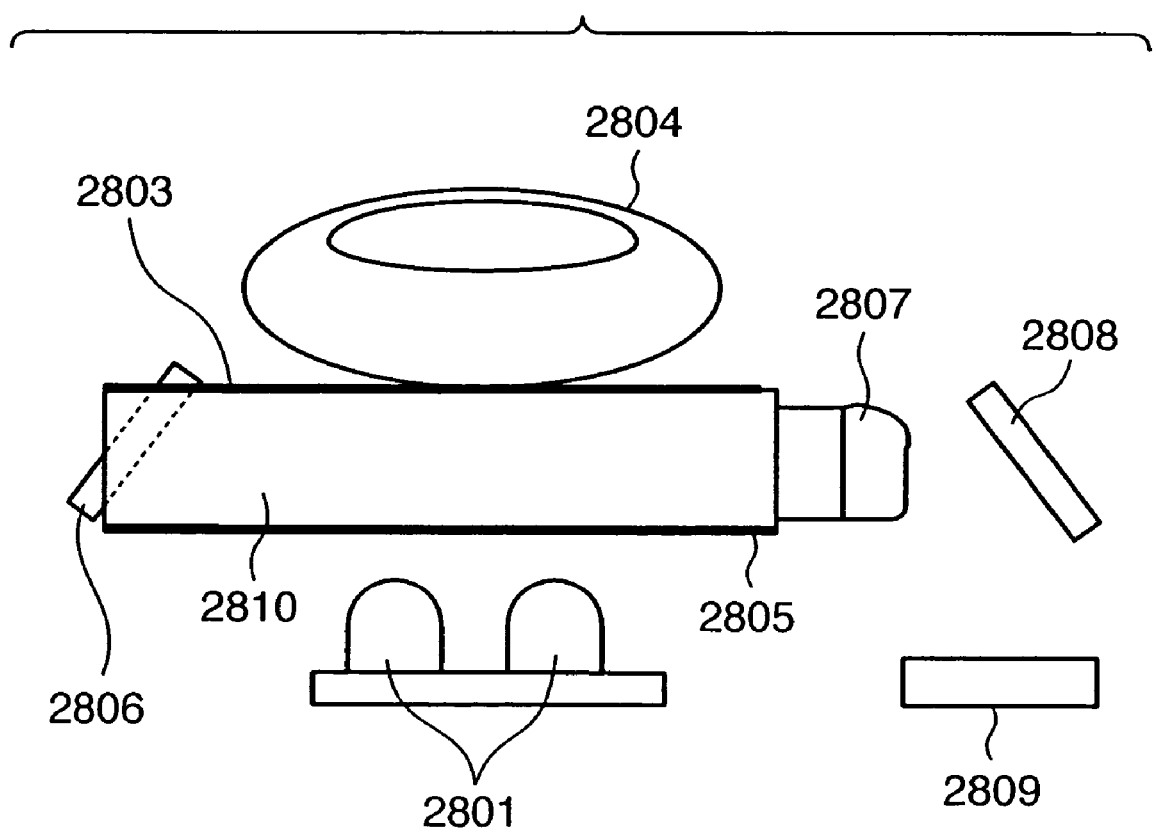
FIG. 28 shows a view for explaining fingerprint read in the image forming system according to the ninth embodiment.

FIG. 28 is a view for explaining details of the fingerprint reader 2676 according to the embodiment of the present invention. An LED 2801 irradiates a reading surface 2803 as the upper surface of a glass plate 2810 with light having a predetermined intensity. A finger 2804 of a user is placed on the reading surface 2803. Of the reflected light from the reading surface 2803, the reflected light from projections of the fingerprint is totally reflected by a reflecting surface 2805 at the bottom of the glass plate 2810, and the light from recesses of the fingerprint passes through the glass plate 2810. The reflected light from the fingerprint projections, which is totally reflected by the reflecting surface 2805 is returned by a return mirror 2806 and condensed by a lens 2807. The reflected light thus condensed by the lens 2807 is returned by a return mirror 2808 again and sent into a read sensor 2809. The read sensor 2809 converts an optical (image) signal into an electrical signal by using a semiconductor element (photodiode) which changes its storage capacity in accordance with light input.

FIG. 29 is a view for explaining an example of tag information stored in a memory 101 of the tag according to the ninth embodiment of the present invention.

In this example, a tag ID is written in addresses 00h and 01h of the memory 101. That is, about 4.2 billion different types of printing sheets can be independently managed by the information in addresses 00h and 01h. Accordingly, this unique tag ID is related to personal information and stored in the memory 101. Also, biological information such as a fingerprint feature amount as personal information is written as personal information data in addresses on and after address 02h. This makes it possible to specify a combination of an RFID tag and user.

Figure 30:
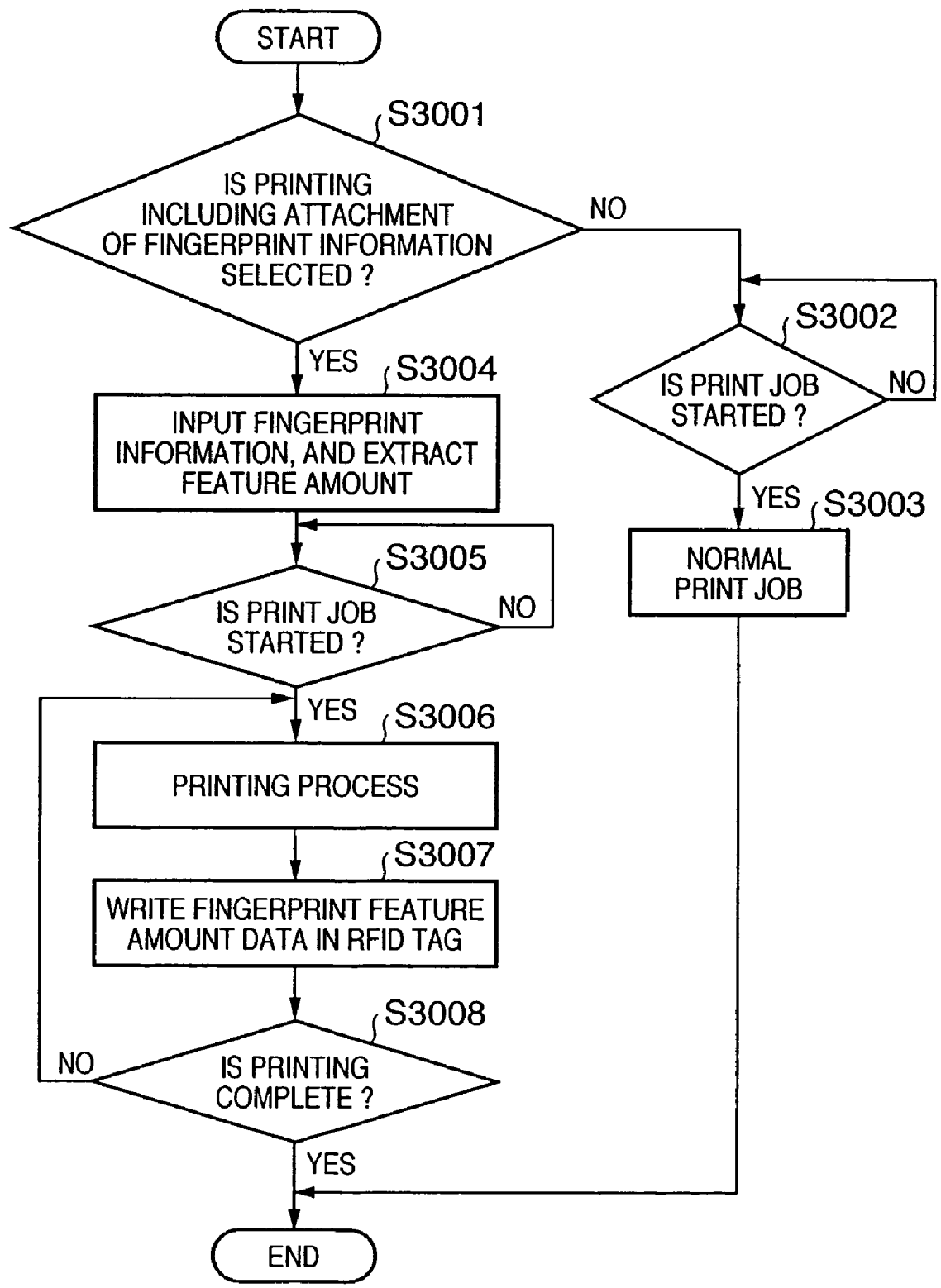
FIG. 30 shows a flowchart for explaining data write to the RFID tag according to the ninth embodiment.
Figure 31:
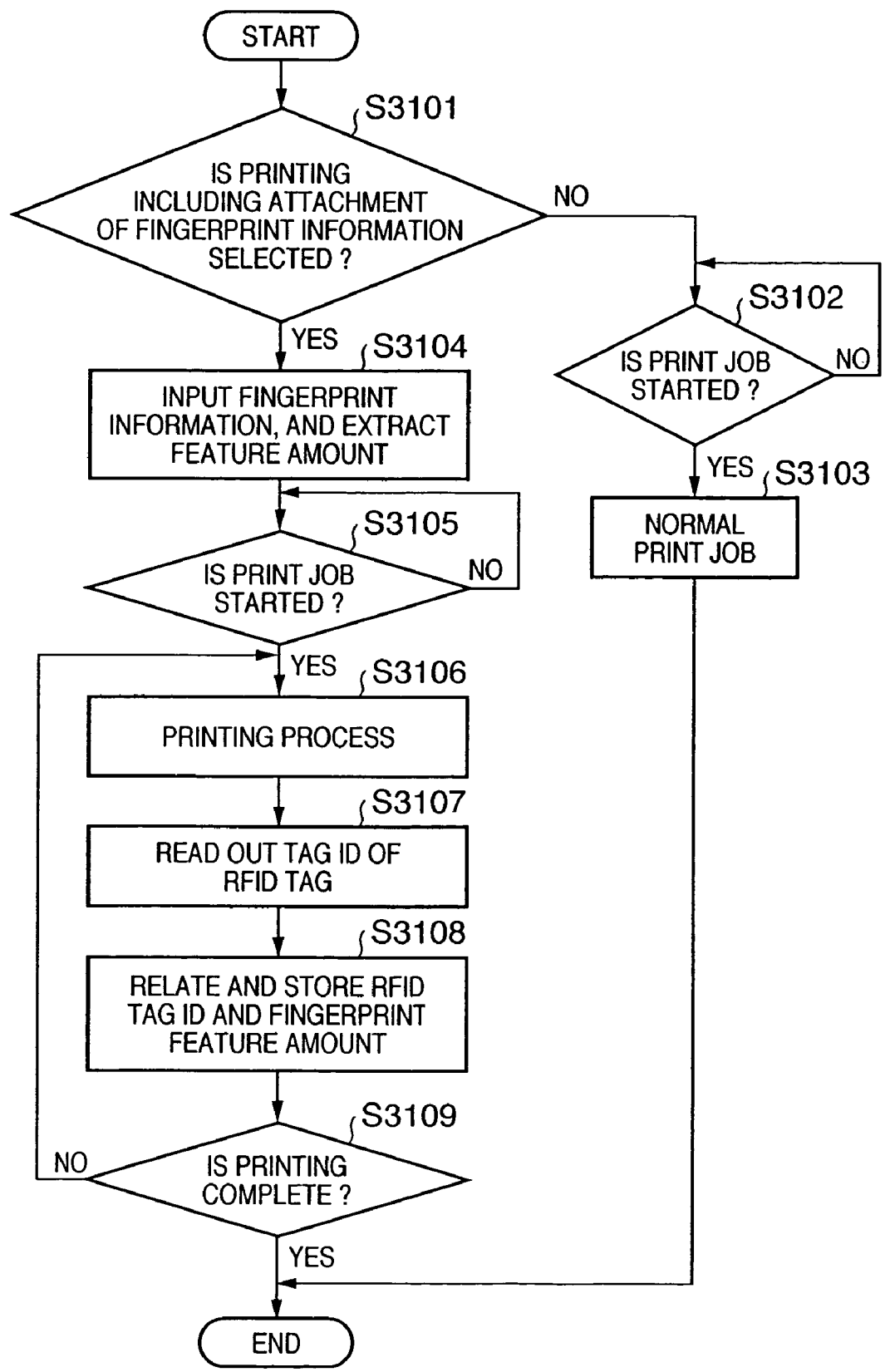
FIG. 31 shows a flowchart for explaining data read from an RFID tag according to the 10th embodiment.

The processing according to the embodiment will be explained below with reference to a flowchart shown in FIG. 30. In this processing, user's fingerprint information read by the fingerprint reader 2676 is written in a tag of a printed printing sheet. Note that a program for executing this processing is stored in a ROM 2074, and the processing is executed under the control of the CPU 2071.

First, in step S3001, whether to write user's personal information in a printed printing sheet during the printing process to be executed is selected. This selection is performed by using a setting window (not shown) displayed on the display unit 2720 of the operation unit 2072. If in step S3001 the selection is so made that no personal information is written in a printed printing sheet, the flow advances to step S3002 to determine whether a print job start instruction is input. A print job can be started by pressing the start key 2714, or by an instruction from a host computer or the like. If an instruction to start the print job is input, the flow advances to step S3003 to execute a normal printing operation. In this operation, the print job is executed such that no RFID tag is attached to a printed printing sheet, or, even if a tag is attached, no personal information is written in the tag.

On the other hand, if in step S3001 the selection is so made that personal information is written in a printed printing sheet, the flow advances to step S3004, and the fingerprint reader 2676 reads and inputs the fingerprint of the user before the printer 1900 performs printing. The thus input fingerprint image is processed and extracted as fingerprint information by the fingerprint information processor 2679, and temporarily stored in the RAM 2075. In step S3005, whether a print job start instruction is input is determined as in step S3002. If a print job start instruction is input, the flow advances to step S3006 to execute a normal print job by which an image is printed on a printing sheet. In this manner, an image is formed and fixed on one printing sheet. Subsequently, in step S3007, an RFID tag is attached to this printing sheet on which the image is fixed. Then, an RFID tag reader/writer 2081 writes the RFID tag data stored in the RAM 2075 into the tag. In this way, the fingerprint information as personal information of the user is written in the RFID tag. In this embodiment, the RFID tag reader/writer 2081 writes the tag information. However, to simply write information, a tag writing circuit having only a writing function may also be used. After that, the flow advances to step S3008 to determine whether the print job of the designated number of sheets is complete. Steps S3006 and S3007 are executed until the print job of the designated number of sheets is completed in step S3008.

In this embodiment as described above, user's personal information (in this embodiment, fingerprint information) can be written on a printed printing sheet. In this manner, it is possible to set the system such that only the user matching this fingerprint information can copy the printing sheet.

10th Embodiment

The 10th embodiment of the present invention will be described below. In this embodiment, data stored in an RFID tag attached to a printed printing sheet is read and stored in a RAM 2075. In addition, fingerprint information of the user who gave an instruction to print the image is related to the tag information and stored in the RAM 2075.

First, in step S3101, whether to write personal information on a printed printing sheet during printing to be processed is selected. This selection is performed by using a setting window (not shown) displayed on a display unit 2720. If in step S3101 the selection is so made that no personal information is written, the flow advances to step S3102 to determine whether a print job start instruction is input, as in step S3002 of the ninth embodiment. If a print job start instruction is input, the flow advances to step S3103 to execute a normal printing operation in which no personal information is written on a printed printing sheet.

On the other hand, if in step S3101 the selection is so made that personal information is written on a printed printing sheet, the flow advances to step S3104, and a fingerprint information sensor 2706 reads the fingerprint of the user as user's personal information before a printer 1900 performs printing. A fingerprint information processor 2679 extracts feature amount data from the fingerprint, and stores the data as fingerprint information in a personal information storage 2680. The flow then advances to step S3105 to determine whether a print job start instruction is input is, as in step S3102. If a print job start instruction is input, the flow advances to step S3106 to execute a print job by which an image is printed and fixed on one printing sheet. After that, an RFID tag attaching unit 2100 attaches an RFID tag to this printing sheet on which the image is printed. Subsequently, in step S3107, an RFID tag reader/writer 2081 reads a tag ID stored in the attached RFID tag 100. In this embodiment, the RFID tag reader/writer 2081 reads the RFID tag information. However, to simply read tag information, a tag reading circuit having only a tag reading function may also be used. After that, the flow advances to step S3108 to relate the read tag ID of the RFID tag to the user's fingerprint feature amount data which is personal information of the current user, and store the thus related tag ID and data in the personal information storage 2680. The personal information storage 2680 can be present in this image forming system, and can also be a communicable external storage (e.g., a server) if the image forming system has a communicating function. The flow then advances to step S3109 to determine whether the printing process of the designated number of sheets is complete. If the printing process of the designated number of sheets is complete, this processing is terminated.

In this embodiment as described above, when an image is printed, personal information which specifies a user who has printed the image can be stored together with a tag ID which specifies the printed printing sheet. Accordingly, when copying of this printing sheet is designated, this copying can be inhibited if a user who has designated the copying of the printing sheet does not match the user who has printed the printing sheet.

Other Embodiment

In the embodiments of the present invention as described above, control information, process information, and position information during image formation and post-processing information for a sheet bundle after printing can be attached to a printed printing sheet. This makes it unnecessary to store and manage these pieces of information in the RAM of the image forming apparatus. It is also possible to eliminate the need to manually inputting sheet information when, e.g., a sheet on which an image is printed is to be moved to a post-processing step and continuously processed.

Also, even when RFID tag data is present for each sheet, it is unnecessary to attach RFID tags to all corresponding printing sheets.

Since an RFID tag can be attached only to one printing sheet for one print job, it is unnecessary to form any extra printing sheet with an expensive RFID tag. This avoids wastefulness.

Furthermore, in an apparatus in which an image transferred on a printing sheet is thermally fixed in the printing process, an RFID tag is attached or data is written in an RFID tag after the printed printing sheet passes through a fixing device. This prevents adverse effects caused by the application of high heat and high pressure to the RFID tag.

In the above embodiments, highly reliable personal information can be obtained by using biometrics such as fingerprint verification or retina pattern verification which is attracting attention as an individual authentication method. Therefore, personal information of a user who has printed a printing sheet can be stored as an RFID tag of the printing sheet.

Additionally, by relating the tag ID of the RFID tag to the personal information of the user who has printed the printing sheet and storing these ID and information, unauthorized use can be prevented when the printing sheet is used again after that. It is also possible to store the log of a printing sheet on which an image is printed.

In the present invention, it is possible to reduce the number of printing media to which an RFID tag is to be attached, and thereby reduce the number of RFID tags to be used.

In the present invention, it is also possible to obtain highly reliable personal information by using biometrics such as fingerprint verification or retina pattern verification, and store this personal information in an RFID tag of a printing medium on which an image is formed.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application No. 2003-333446 filed on Sep. 25, 2003, and Japanese Patent Application No. 2003-286159 filed on Aug. 4, 2003, which are hereby incorporated by reference herein.

What is claimed is:

1. An image reading apparatus for reading an image from an original having an RFID tag including a storage unit which stores data and a transmitter/receiver which transmits and receives the data by radio, comprising:
   a receiving unit which receives data stored in an RFID tag of the original;
   a read control unit which controls reading of the original on the basis of the received data;
   an image reading unit which reads the original under the control of the read control unit;
   a data editing unit which edits the received data in accordance with contents of the control performed by the read control unit; and
   a transmitting unit which transmits the data edited by the data editing unit and writes the transmitted data in the RFID tag of the original,
   wherein if the original is a child original formed by copying an image of a parent original, the storage unit of the RFID tag stores lineal generation information representing a generation of the original, and the read control unit controls reading of the original on the basis of the lineal generation information contained in the received data.

2. The apparatus according to claim 1, further comprising a storage unit which stores read limiting information for limiting reading of the original,
   wherein the read control unit determines whether reading of the image is limited on the basis of the lineal generation information and read limiting information contained in the received data, and controls reading of the image on the basis of a result of the determination.

3. The apparatus according to claim 2, wherein the read limiting information contains upper-limit lineal generation information representing an upper-limit lineal generation by which reading of the original is executable.

4. The apparatus according to claim 3, further comprising a warning unit which outputs warning information if a lineal generation of the original exceeds the upper-limit lineal generation.

5. The apparatus according to claim 1, wherein the data editing unit further comprises a data forming unit which forms additional data to be stored in the storage unit of the RFID tag, and the transmitting unit transmits and writes the additional data in the storage unit of the RFID tag.

6. The apparatus according to claim 5, wherein if the read control unit limits reading of the original, the data forming unit forms data indicating that reading of the original is limited.

7. The apparatus according to claim 1, further comprising a determining unit which determines whether data can be received, via the receiving unit, from an original, wherein if the determining unit determines that the data cannot be received, the read control unit inhibits reading of the original.

8. The apparatus according to claim 7, further comprising a setting unit which sets whether to validate a read inhibiting process for an original from which the data cannot be received, wherein if the read inhibiting process is valid, the read control unit executes the read inhibiting process.

9. The apparatus according to claim 1, further comprising an attaching unit which attaches the RFID tag to the original.

10. An image forming apparatus for forming, on a printing medium having an RFID tag, an image of an original read by the image reading apparatus cited in claim 1, comprising:

a calculating unit which calculates a lineal generation of an image to be formed on the printing medium, on the basis of the lineal generation information representing a generation of the original; and a writing unit which writes the lineal generation of the image to be formed, calculated by the calculating unit, on the printing medium.

* * * * *